(12) United States Patent
Aznaurashvili et al.

(10) Patent No.: US 11,288,714 B2
(45) Date of Patent: Mar. 29, 2022

(54) SYSTEMS AND METHODS FOR PRE-COMMUNICATING SHOPPERS COMMUNICATION PREFERENCES TO RETAILERS

(71) Applicant: Capital One Services, LLC, McLean, VA (US)

(72) Inventors: Zviad Aznaurashvili, McLean, VA (US); Timur Sherif, Washington, DC (US); Steve Blanchet, Vienna, VA (US); Hannes Jouhikainen, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 336 days.

(21) Appl. No.: 16/023,623

(22) Filed: Jun. 29, 2018

(65) Prior Publication Data

US 2020/0005336 A1 Jan. 2, 2020

(51) Int. Cl.
*G06Q 30/02* (2012.01)
*G06K 9/00* (2006.01)
(Continued)

(52) U.S. Cl.
CPC ......... *G06Q 30/0281* (2013.01); *G06F 3/011* (2013.01); *G06K 9/00302* (2013.01);
(Continued)

(58) Field of Classification Search
CPC .............. G06Q 30/0281; G06Q 30/0201; G06F 3/011; G06K 9/00302; G06K 9/00315; G10L 15/26; G10L 25/63; H04L 67/306
See application file for complete search history.

(56) References Cited

U.S. PATENT DOCUMENTS 6,571,216 B1* 5/2003 Garg ................. G06Q 30/02
705/14.25
8,219,438 B1* 7/2012 Moon ................ G06Q 30/0201
705/7.29
(Continued)

FOREIGN PATENT DOCUMENTS

CN 106415664 A * 2/2017 ........ H04M 1/72436

OTHER PUBLICATIONS

English translation of CN106415664A. Retrieved from espacenet.com on Nov. 18, 2021 (Year: 2016).*
(Continued)

*Primary Examiner* — Mehmet Yesildag
*Assistant Examiner* — Jeremy L Gunn
(74) *Attorney, Agent, or Firm* — Finnegan, Henderson, Farabow, Garrett & Dunner, LLP

(57) ABSTRACT

Systems and methods are provided for providing a customized user experience. Providing a customized user experience may include receiving, from a graphical user interface displayed on a mobile device a user input indicative of a preferred level of interaction by the user, and monitoring, by a sensor, a facial expression of the user. Then, a first preference metric may be assigned to the user based on the monitored facial expression. Providing a customized user experience may further include monitoring, by a sensor, a behavior of the user, assigning a second preference metric based on the monitored behavior, and aggregating at least the user input, the first preference unit, and the second preference metric to generate a preference score of the user. The preference score may be stored in a central database, displayed on a remote device, and used to modify a customer service experience.

13 Claims, 8 Drawing Sheets

(51) Int. Cl.
*G10L 25/63* (2013.01)
*H04L 67/306* (2022.01)
*G10L 15/26* (2006.01)
*G06F 3/01* (2006.01)
*G06N 20/00* (2019.01)
*H04W 4/80* (2018.01)

(52) U.S. Cl.
CPC ......... *G06K 9/00315* (2013.01); *G06N 20/00* (2019.01); *G06Q 30/0201* (2013.01); *G10L 15/26* (2013.01); *G10L 25/63* (2013.01); *H04L 67/306* (2013.01); *H04W 4/80* (2018.02)

(56) References Cited

U.S. PATENT DOCUMENTS

| | | | | |
|---|---|---|---|---|
| 8,600,804 | B2* | 12/2013 | Ramchandani | G06Q 30/02 705/14.23 |
| 9,043,230 | B2* | 5/2015 | Adoni | G06Q 30/0631 705/26.8 |
| 9,747,497 | B1* | 8/2017 | Sharma | G06K 9/00771 |
| 9,836,756 | B2* | 12/2017 | Rider | G06Q 30/0201 |
| 9,892,424 | B2* | 2/2018 | Abraham | G06Q 30/0251 |
| 2010/0086215 | A1* | 4/2010 | Bartlett | G06K 9/00335 382/197 |
| 2013/0124257 | A1* | 5/2013 | Schubert | G06Q 30/02 705/7.29 |
| 2014/0365334 | A1* | 12/2014 | Hurewitz | G06Q 30/0613 705/26.41 |
| 2015/0324810 | A1* | 11/2015 | Vincent | G06Q 30/0201 705/7.29 |
| 2015/0371303 | A1* | 12/2015 | Suri | G06Q 30/0613 705/26.41 |
| 2017/0337602 | A1* | 11/2017 | Davis | G06Q 30/0607 |

OTHER PUBLICATIONS

R.-C. Moraru and A. Caaron, "Automated recognition of facial expressions and gender in humans implemented on mobile devices," 2021 International Aegean Confon Electrical Machines and Power Electronics (ACEMP) & 2021 International Conference on Optimization of Electrical and Electronic Equipmen (Year: 2021).*

* cited by examiner

SYSTEMS AND METHODS FOR PRE-COMMUNICATING SHOPPERS COMMUNICATION PREFERENCES TO RETAILERS

TECHNICAL FIELD

Embodiments of the present disclosure relate to systems and methods for pre-communicating shoppers' communication preferences to retailers. In particular, the embodiments of the present disclosure relate to using electronic sensors, such as image sensors or audio sensors, and using mobile devices to pre-communicate shoppers' communication preferences to retailers.

BACKGROUND

One of the factors that may contribute to lost sales at a store may be the level of interaction between retailers and shoppers. For example, there are different types of shoppers. While there may be shoppers who enjoy the time and personal attention received from a sales associate at a store, there may be other shoppers who would prefer to browse around the store and shop quietly without having to interact with the sales associates. Exceeding a level of interaction between the sales associates and shoppers that exceeds the shoppers' tolerance may result in shoppers leaving the store even though the shoppers wanted to purchase a specific merchandise from the store. Specifically, shoppers often walk through their favorite store to see if there may be merchandise items they want to purchase. However, shoppers may ultimately decide not to purchase any merchandise item and leave the store after being confronted with several sales associates asking if the shoppers need assistance. That is, shoppers may leave the store in search of a more relaxed shopping environment. As a result, a store may lose a significant volume of sales by providing an excessive level of interaction between shoppers and sales associates.

In addition, with an uncontrolled level of interaction between shoppers and sales associates, shoppers may be more inclined to purchase merchandise items online. The ubiquity and ease of online shopping has the potential to decrease sales from a store. For example, customers may walk into a brick and mortar store hoping to shop quietly, but then decide to order the item online potentially with another merchant after being confronted by sales associates. Customers may do so because online ordering provides the customer with the convenience of shopping for merchandise items quietly without any pressure from such sales associates.

On the other hand, some shoppers may prefer a higher level of attention from sales associates when they enter the store. For example, some shoppers may prefer sales associates who are more attentive to the shoppers' needs and are more eager to provide assistance to the shoppers. If the level of interaction between sales associates and shoppers at the store, however, is lower than desired, shoppers may leave the store in search of a more attentive shopping environment.

Furthermore, shoppers' merchant-level communication preferences may vary. For example, some shoppers may prefer to interact with certain merchants' sales associates more or less than other merchants' sales associates. That is, some shoppers may prefer to interact with sales associates at merchant A more or less than sales associates at merchant B.

Lost sales due to customer experience may not be limited to shopping in stores. Similar situations could occur in transportation or ride-sharing experiences. For example, some customers enjoy interacting with drivers during their trip while other customers prefer to remain quiet during their trip. It may be difficult for drivers to predict the level of interaction each customer desires. Therefore, customers may give lower ratings to drivers or customers may ultimately choose not to request rides in the future because of their unpleasant customer experiences.

In view of the above deficiencies, there exists a need for improved systems and methods for providing a customized user experience. Further, there exists a need for improved systems and methods for pre-communicating a user's communication preferences. For example, there exists a need for improved systems and methods that allow sales associates to use electronic sensors, such as image sensors or audio sensors, in order to monitor shoppers' behavior and determine the shoppers' emotions by applying facial recognition. Based on at least the monitored behavior and/or determined emotion of the shoppers, sales associates would be able to tailor shoppers' customer service experience based on the shoppers' preferences and emotions. Such improved systems and methods have the potential to increase sales and revenue by allowing service providers to access information related to user's desired customer service experience beforehand and provide customers with appropriate levels of customer experience. For example, such improved systems and methods have the potential to dramatically increase retail sales at a store by creating a customized shopping environment, in which shoppers gain their desired level of interaction with sales associates.

SUMMARY

In accordance with an exemplary embodiment of the present disclosure, systems and methods are provided for providing a customized user experience. By way of example, the method comprises receiving, from a graphical user interface displayed on a mobile device, a user input indicative of a preferred level of interaction by the user, monitoring, by a sensor, a facial expression of the user, assigning a first preference metric based on the monitored facial expression, monitoring, by a sensor, a behavior of the user, assigning a second preference metric based on the monitored behavior, aggregating at least the user input, the first preference metric, and the second preference metric to generate a preference score of the user, storing the preference score in a central database, and displaying the preference score on a remote device, wherein the preference score is used to modify a customer service experience.

In some embodiments, the sensor which monitors the facial expression of the user may comprise an image sensor. The method of monitoring the facial expression may further comprise recording a video of the user, separating the video in a plurality of frames, and processing the frames, by a machine-learning algorithm, to match the frames to a corresponding user emotion.

In other embodiments, the method may further comprise recording, by a microphone, a voice of the user, assigning a third preference metric based on the recorded voice, and aggregating at least the user input, the first preference metric, the second preference metric, and the third preference metric to generate the preference score. In other aspects, the method may further comprise receiving a history of a plurality of transactions associated with the user, and generating the preference score based at least on the transaction history. The transaction history may further comprise at least one of time spent before making the transactions or degrees of assistance received before making the transactions.

In some aspects, generating the preference score may comprise comparing the user input, the first preference metric, and the second preference metric to a priority level hierarchy, determining priority levels associated with the user input, the first preference metric, and the second preference metric, and weighting the user input, the first preference metric, and the second preference metric based on the determined priority levels.

In yet another embodiment, each of the mobile device and the remote device may comprise at least one of a smartphone, a tablet, a wearable device, or a virtual reality headset. In some embodiments, the sensor that monitors the facial expression of the user and the sensor that monitors the behavior of the user may comprise the same sensor. In other embodiments, the preference score generated may be indicative of a degree of customer service assistance to be offered to the user.

In accordance with another exemplary embodiment, a system is provided for providing a customized user experience. By way of example, the system comprises a processor, and a memory storing instructions, wherein the instructions cause the processor to recognize, by at least one sensor at a predetermined location, a presence of a user, request a preference score associated with the user from a mobile device associated with the user, receive, by the processor, the preference score, and transmit, by the processor, the preference score to a remote device for display, wherein the preference score is based on at least one of a user input indicative of a preferred level of interaction by the user, a facial expression, an emotion, a behavior, or a tracked movement of the user.

In some embodiments, the sensor may be a Bluetooth low-energy beacon, an RFID device, or a wireless sensor. In other embodiments, recognizing the presence of the user may further comprise receiving an electromagnetic signal from the mobile device. In order to determine the emotion, the instructions may cause the processor to record, by an image sensor, a video of the user, separate the video into a plurality of frames, and process the frames, by a machine-learning algorithm operating on the processor, to match the frames to a corresponding user emotion stored in the memory.

In yet another embodiment, the preference score generated may further be based on a history of a plurality of transactions associated with the user. The transaction history may comprise at least one of time spent before making the transactions or degrees of assistance received before making the transactions. In other embodiments, the preference score generated may further be based on a voice recorded by a microphone. The preference score may be indicative of a degree of customer service assistance to be offered to the user.

In accordance with another exemplary embodiment, a computer-implemented method is disclosed for providing a customized user experience. By way of example, the method comprises receiving, from a graphical user interface displayed on a mobile device, a user input indicative of a preferred level of interaction by the user, determining an emotion of the user, wherein determining the emotion comprises recording, by an image sensor, a video of the user, separating the video into a plurality of frames, and processing the frames, by a machine-learning algorithm, to match the frames to a corresponding user emotion. The method further comprises assigning a first preference metric based on the determined emotion, aggregating at least the user input and the first preference metric to generate a preference score, storing the preference score in a central database, and displaying the preference score, wherein the preference score is used to modify a customer service experience.

In accordance with another exemplary embodiment, a computer-implemented method of providing a customized user experience is disclosed. By way of example, the method comprises receiving, from a first device, a plurality of electromagnetic signals generated by a plurality of sensors, the first device being associated with a user, determining, by a processor, using triangulation, a movement of the user based on strengths of the received electromagnetic signals, and locations of the sensors, requesting, by a second device, a preference score associated with the user, the preference score being stored in a central database, determining, by an image sensor positioned on the second device, an emotion of the user, wherein determining the emotion of the user comprises recording a video of the user, separating the video into a plurality of frames, and processing the frames, by a machine-learning algorithm, to match the frames to one of a plurality of user emotions, and modifying the preference score based on the emotion of the user.

In some embodiments, the first device and the second device may each comprise at least one of a smartphone, a tablet, a wearable device, or a virtual reality headset. In other embodiments, the sensor may comprise at least one Bluetooth low-energy beacon, at least one RFID device, or at least one wireless sensor. In other embodiments, the preference score may be based on at least a user input indicative of the user's preferred level of interaction.

In another embodiment, the method may further comprise requesting, by the second device, a history of a plurality of transactions associated with the user, wherein the transaction history comprises at least one of time spent before making the transactions, or degrees of assistance received before making the transactions. The method may further comprise modifying the preference score based on the transaction history. In some embodiments, the modified preference score may be indicative of a degree of customer service assistance to be offered to the user.

In yet another embodiment, the method may further comprise aggregating the transaction history, the movement of the user, and the emotion of the user, and modifying the preference score based on the aggregation. In other aspects, the method may further comprise recording, by a microphone, a voice of the user, and modifying the preference score based on the recorded voice.

In accordance with another exemplary embodiment, a system is disclosed for providing a customized user experience, comprising at least one memory storing instructions and at least one processor executing the instructions to perform operations. The operations comprise receiving, from a first device, a plurality of electromagnetic signals generated by a plurality of sensors, the first device being associated with a user, determining, by a processor using triangulation, a movement of the user based on strengths of the received electromagnetic signals and locations of the sensors, requesting, by a second device, a preference score associated with the user, the preference score being stored in a central database, determining, by an image sensor positioned on the second device, an emotion of the user, wherein determining the emotion of the user comprises recording a video of the user, separating the video into a plurality of frames, and processing the frames, by a machine-learning algorithm, to match the frames to one of a plurality of user emotions, and modifying the preference score based on the emotion of the user.

In some embodiments, the first device and the second device may each comprise at least one of a smartphone, a tablet, a wearable device, or a virtual reality headset. In other embodiments, the sensors may comprise at least one Bluetooth low-energy beacon, at least one RFID device, or at least one wireless sensor. In another embodiment, the preference score may be based on at least a user input indicative of the user's preferred level of interaction.

In yet another embodiment, the operations may further comprise requesting, by the second device, a history of a plurality of transactions associated with the user, wherein the transaction history comprises at least one of time spent before making the transactions or degrees of assistance received before making the transactions, and modifying the preference score based on the transaction history. The modified preference score may be indicative of a degree of customer service assistance to be offered to the user. In other embodiments, the operations may further comprise recording, by a microphone, a voice of the user, and modifying the preference score based on the recorded voice.

In accordance with another exemplary embodiment, a non-transitory computer-readable medium is provided having stored thereon executable instructions that, when executed by a processor, cause the processor to perform operations. The operations comprise receiving, from a first device, a plurality of electromagnetic signals generated by a plurality of sensors, the first device being associated with a user, determining, by a processor using triangulation, a movement of the user based on strengths of the received electromagnetic signals and locations of the sensors, requesting, by a second device, a preference score associated with the user, the preference score being stored in a central database, determining, by an image sensor positioned on the second device, an emotion of the user, wherein determining the emotion of the user comprises recording a video of the user, separating the video into a plurality of frames, and processing the frames, by a machine-learning algorithm, to match the frames to one of a plurality of user emotions, and modifying the preference score based on at least one of the movement of the user, the preference score, or the determined emotion of the user.

Additional objects and advantages of the embodiments of the present disclosure will be set forth in part in the description which follows, and in part will be obvious from the description, or may be learned by practice of the embodiments of the present disclosure.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this present disclosure, illustrate disclosed embodiments of the present disclosure and, together with the description, serve to explain the principles of the present disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts. The disclosed embodiments include methods and systems configured to provide, for example, a customized user experience. It should be appreciated, however, that the present disclosure is not limited to these specific embodiments and details, which are exemplary only. It is further understood that one possessing ordinary skill in the art, in light of known systems and methods, would appreciate the use of the embodiments of the present disclosure for its intended purposes and benefits in any number of alternative embodiments, depending on specific design and other needs. A merchant and system supporting a merchant are used as examples for the disclosure. The disclosure is not intended to be limited to merchants only.

Figure 1:
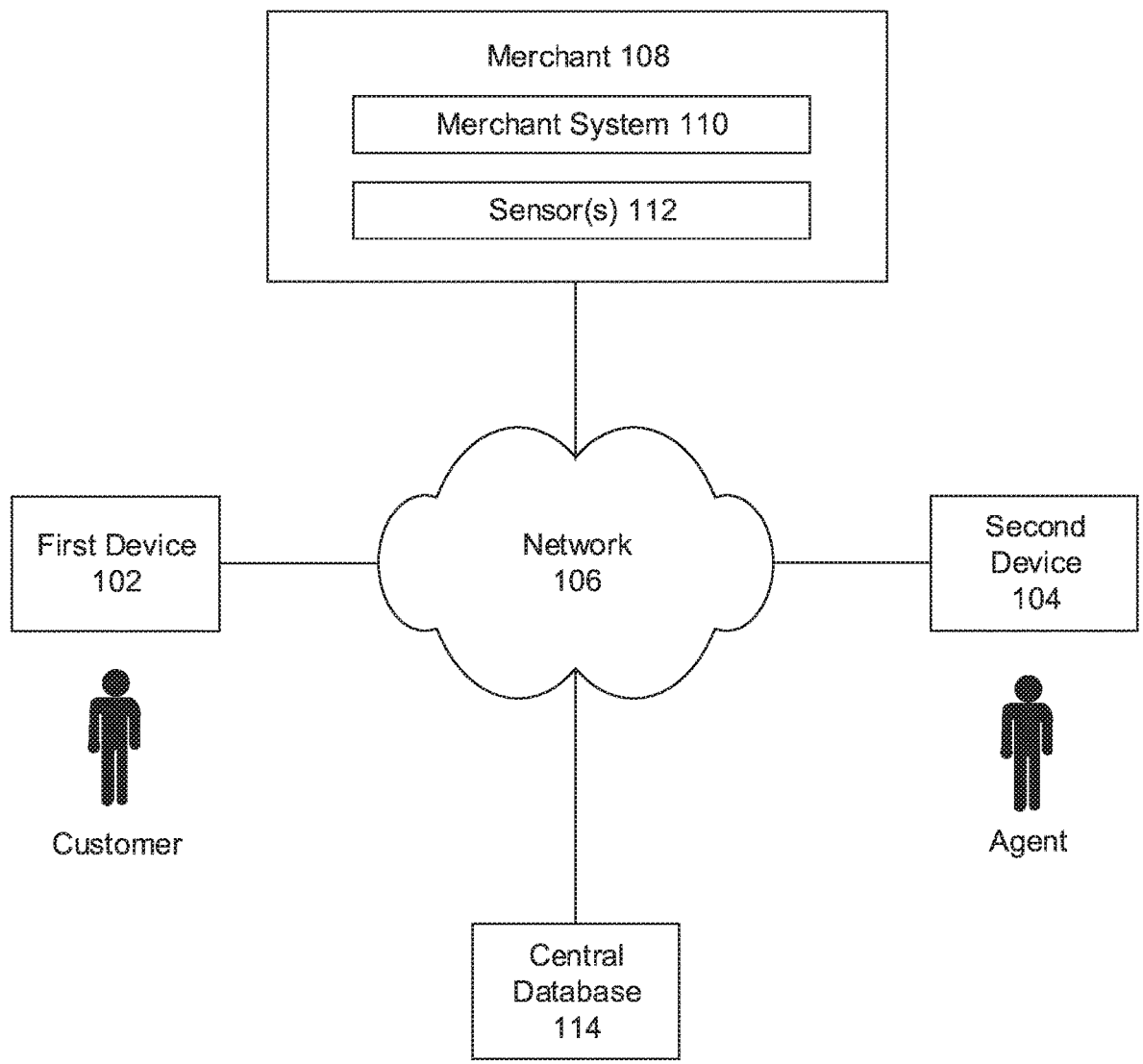
FIG. 1 shows an exemplary schematic diagram of a system for providing customized user experience in accordance with the embodiments of the present disclosure.

FIG. 1 shows an exemplary schematic diagram of a system 100 for providing customized user experience in accordance with the embodiments of the present disclosure. The arrangement and number of components in system 100 is provided for purposes of illustration. Additional arrangements, number of components, and other modifications may be made, consistent with the present disclosure.

As shown in FIG. 1, in one embodiment, system 100 may include a first device 102, a second device 104, network 106, and central database 114. Merchant 108 may include a merchant system 110 and sensor(s) 112. Merchant 108 may be an entity that offers goods, services, and/or information, such as a retailer (e.g., Macy's®, Target®, etc.), grocery store, ride-sharing or transportation provider, service provider (e.g., utility company, etc.), or any other type of entity that offers goods, services, and/or information that consumers (not shown) may purchase, consume, use, etc. Merchant 108 may offer for sale one or more products. In one example, merchant 108 may be associated with brick and mortar location(s) that a consumer may physically visit and purchase a product or service. Merchant 108 may also include back- and/or front-end computing components that store data and execute software instructions to perform operations consistent with disclosed embodiments, such as computers that are operated by employees of the merchant (e.g., back office systems, etc.).

Merchant 108 may include merchant system 110 and one or more sensors 112. Merchant system 110 may include point-of-sale terminals, tablets, personal digital assistants, personal computers, laptop computers, desktop computers, smartphones, netbooks and/or other types of electronics or communication devices. In some exemplary embodiments, merchant system 110 may be configured to facilitate and/or perform transactions, for example, sale of one or more merchandise items to one or more customers in a store.

In other exemplary embodiments, merchant system 110 may include one or more servers or other type of computer devices configured to execute software instructions stored in memory to perform one or more processes consistent with the disclosed embodiments. For example, merchant system 110 may include one or more memory device(s) storing data and software instructions and one or more processor(s) configured to use the data and execute the software instructions to perform server-based functions and operations known to those skilled in the art. Merchant system 110 may include server(s) that are configured to execute stored software instructions to perform operations associated with merchant 108, including one or more processes associated with processing purchase transactions, generating transaction data, generating product data (e.g., SKU data) relating to purchase transactions, etc.

Merchant system 110 may include one or more servers that may be, for example, mainframe computers, one or more web servers, one or more application servers, one or more database servers, or any combination of these components. In certain embodiments, merchant system 110 (or a system including merchant system 110) may be configured as a particular apparatus, system, and the like based on the storage, execution, and/or implementation of the software instructions that perform one or more operations consistent with the disclosed embodiments. A merchant server may be standalone, or it may be part of a subsystem, which may be part of a larger system. For example, a merchant server may represent distributed servers that are remotely located and communicate over a network (e.g., network 106) or a dedicated network, such as a LAN. In certain aspects, merchant system 110 may include one or more web servers that execute software that generates, maintains, and provides web site(s) for a respective merchant 110 that is accessible over network 106. In other aspects, a merchant system 110 may connect separately to web server(s) or similar computing devices that generate, maintain, and provide web site(s) for a merchant.

Merchant 108 may include one or more sensor(s) 112 to detect the presence of and/or communicate with a customer device in the vicinity of sensor(s) 112. By way of example, sensor(s) 112 may include a Bluetooth low energy beacon, a radio frequency identification (RFID) device, a wireless sensor, an electromagnetic wave transmitter and receiver pair, and/or any other type of device configured to detect the presence of an electronic device. For the purposes of this disclosure, the location of a first device 102 may be presumed to reveal the location of customer operating the device. In some exemplary embodiments, sensor(s) 112 may include one or more processor(s) configured to access data and/or execute software instructions stored in memory to perform one or more processes consistent with the disclosed embodiments. In some exemplary embodiments, sensor(s) 112 may be operated by merchant 108 and may be configured to communicate to and/or through network 106 with other components, such as merchant system 110, a first device 102, a second device 104, and/or a central database 114. In other exemplary embodiments, sensor(s) 112 may be operated by a third party (not shown) to merchant 108, such as a third-party contractor to provide services consistent with disclosed embodiments.

Each sensor 112 may have a sensor identifier associated with sensor 112. The sensor identifier may be numeric or alphanumeric and may be used by merchant system 110, a first device 102, a second device 104, and/or a central database 114 to identify and/or locate sensor 112. In some exemplary embodiments, the sensor identifier may be a Bluetooth identifier corresponding to sensor 112. In other exemplary embodiments, sensor identifier may include a Bluetooth profile associated with sensor(s) 112. In yet other exemplary embodiments, sensor identifier may include a coordinate position of sensor(s) 112 in a store.

A first device 102 may be associated with a user or a customer, who may be a customer or potential customer to merchant 108. The user or the customer may operate a first device 102 to communicate to and/or through network 106 with other components of system 100, such as a second device 104, merchant system 110, and/or central database 114. By way of example, the first device 102 may include one or more devices such as a smartphone, a tablet, a netbook, an electronic reader, a pair of electronic glasses, a smart watch, a personal digital assistant, a personal computer, a laptop computer, a pair of multifunctional glasses, a tracking device, or other types of electronics or communication devices. In some exemplary embodiments, the first device 102 may be configured to execute a customer assistance application (for example, customer assistance application 312 in FIG. 3), which may be configured to allow the user or the customer to input a value indicative of a preferred level of interaction by the user. In some embodiments, the first device 102 may include one or more sensors (not shown), such as any type of image sensor and/or audio sensor. For example, the first device 102 may include a camera and/or a microphone.

A second device 104 may be associated with an agent, who may be a retailer, ride-sharing or transportation provider, service provider, or any other type of entity that offers goods, services, and/or information that customers may purchase, consume, use, etc. The agent may be associated with the merchant 108. The agent may operate the second device 104 to communicate to and/or through network 106 with other components of system 100, such as a first device 102, merchant system 110, and/or central database 114. By way of example, the second device 104 may include electronic devices such as smartphones, tablets, netbooks, electronic readers, electronic glasses, smart watches, personal digital assistants, personal computers, laptop computers, pair of multifunctional glasses, tracking device, and/or other types of electronics or communication devices. In some exemplary embodiments, the second device 104 may be configured to execute a customer assistance application (for example, customer assistance application 312 in FIG. 3), which may be configured to allow the agent to request and/or receive a value indicative of a user's or a customer's preferred level of interaction. The second device 104 may be configured to communicate with the central database 114 through the network 106 to receive and/or store information associated with the user or the customer. The second device 104 may be configured to receive and/or store information associated with the user or the customer automatically or upon request. In some embodiments, the second device 104 may include one or more sensors (not shown), such as any type of image sensor and/or audio sensor. For example, the second device 104 may include a camera and/or a microphone.

In an exemplary embodiment, a customer may use a first device 102 prior to or while shopping for merchandise items in a store. In one exemplary embodiment sensor(s) associated with a merchant 108, merchant system 110, and/or second device 104 may detect the presence of the first device 102 when the first device 102 is in the vicinity of sensor(s) 112. For example, when a customer walks into a store or is approaching the vicinity of the store, sensor(s) 112 may detect the presence of the customer. Detecting the presence of the customer may include sensor(s) 112 receiving one or more signals (including electromagnetic signals, such as Wi-Fi, Bluetooth, or the like) from the first device 102 associated with the customer. In some embodiments, upon detecting the presence of the customer, a merchant 108, merchant system 110, and/or second device 104 may request and/or receive information associated with the customer associated with the first device 102. Information associated with the customer may include, for example, a value indicative of a preferred level of interaction. Information associated with the customer may be obtained via the network 106 from the central database 114. In other embodiments, information associated with the customer may be requested via the network 106 directly from the customer by generating a message on the first device 102 associated with the customer.

System 100 may also include network 106 which may facilitate communications between merchant 108, merchant system 110, sensor(s) 112, a first device 102, a second device 104, and/or central database 114. In some exemplary embodiments, network 106 may include any combination of communications networks. For example, network 106 may include the Internet and/or any type of wide area network, an intranet, a metropolitan area network, a local area network (LAN), a wireless network, a cellular communications network, a Bluetooth network, or any other type of electronics communications network, etc.

System 100 may also include a central database 114 which may include one or more memory devices that store information and are accessed through network 106. By way of example, central database 114 may include Oracle™ databases, Sybase™ databases, or other relational databases or non-relational databases, such as Hadoop sequence files, HBase, or Cassandra. Central database 114 may include, for example, customer's preferred level of interaction, customer's interaction history with one or more agents, customer and sensor position data, sensor identifiers, merchandise identifiers, customer profiles, customer credentials, customer credit history, customer transaction history, information related to one or more items purchased or selected for purchase by one or more customers, financial information related to one or more financial accounts, and/or other financial data associated with one or more customers, etc. Additionally or alternatively, the data stored in the database 114 may take or represent various forms including, but not limited to, documents, presentations, spreadsheets, textual content, mapping and geographic information, rating and review information, pricing information, address information, profile information, information regarding sensor(s) 112, audio files, video files, and a variety of other electronic data, or any combination thereof.

Central database 114 may be included in the system 100. Alternatively, central database 114 may be located remotely from the system 100. Central database 114 may include computing components (e.g., database management system, database server, etc.) configured to receive and process requests for data stored in memory devices of central database 114 and to provide data from central database 114.

The components and arrangement of the components included in system 100 may vary. Thus, system 100 may further include other components that perform or assist in the performance of one or more processes consistent with the disclosed embodiments. Further, system 100 may include any number of merchants 108, merchant systems 110, sensor(s) 112, first device 102, second device 104, and/or central database 114. Although exemplary functions may be described as performed by a particular component of system 100 for ease of discussion, some or all disclosed functions of that particular component may interchangeably be performed by one or more of merchant system 110, sensor(s) 112, first device 102, second device 104, and/or central database 114.

Figure 2:
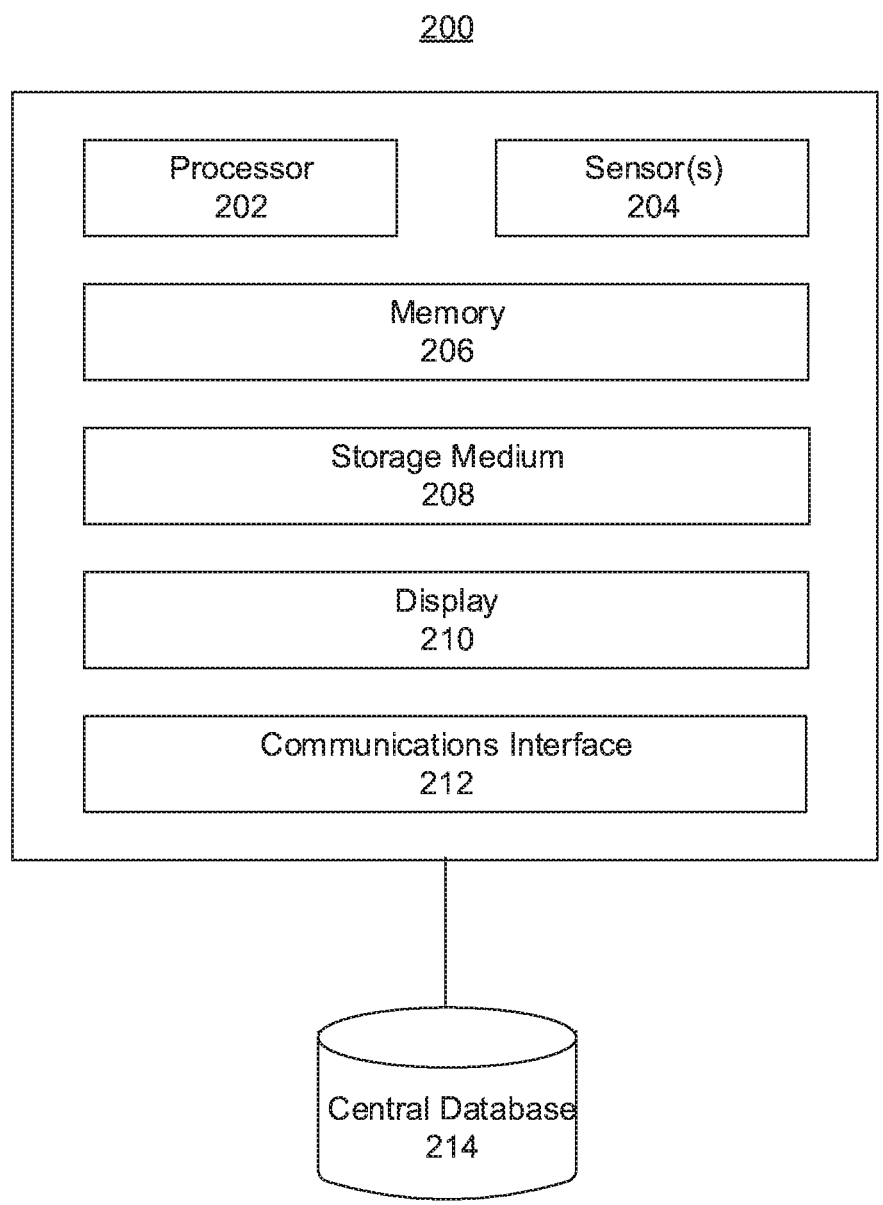
FIG. 2 shows an exemplary schematic diagram of a system for providing customized user experience in accordance with the embodiments of the present disclosure.

FIG. 2 illustrates an exemplary system 200 for implementing embodiments and features of the present disclosure. By way of example, system 200 or similar computing devices may be used to implement merchant system 110, sensor(s) 112, first device 102, second device 104, and/or central database 114. The arrangement and number of components in system 200 are provided for purposes of illustration. Additional arrangements, number of components, and other modifications may be made, consistent with the present disclosure.

System 200 may include one or more processors 202 for executing instructions. System 200 may also include one or more input/output (I/O) devices (not shown). By way of example, I/O devices may include physical keyboards, virtual touch-screen keyboards, mice, joysticks, styluses, etc. In certain exemplary embodiments, I/O devices may include a microphone (not shown) for providing input to system 200 using, for example, voice recognition, speech-to-text, and/or voice command applications. In other exemplary embodiments, I/O devices may include a telephone keypad and/or a keypad on a touch-screen for providing input to system 200. In yet other exemplary embodiments, input may be provided to system 200 in the form of spoken information provided by a user to an agent associated with system 200.

In addition, system 200 may include one or more sensor(s) 204. Sensor(s) 204 may include one or more image sensors, one or more audio sensors, or any other types of sensors configured to monitor a user. For example, sensor(s) may include one or more cameras and/or one or more microphones. As further illustrated in FIG. 2, system 200 may include memory 206 configured to store data or one or more instructions and/or software programs that perform functions or operations when executed by the one or more processors 202. By way of example, memory 206 may include Random Access Memory (RAM) devices, NOR or NAND flash memory devices, Read Only Memory (ROM) devices, etc. System 200 may also include storage medium 208 configured to store data or one or more instructions and/or software programs that perform functions or operations when executed by the one or more processors 202. By way of example, storage medium 208 may include hard drives, solid state drives, tape drives, RAID arrays, compact discs (CDs), digital video discs (DVDs), Blu-ray discs (BD), etc. Although FIG. 2 shows only one memory 206 and one storage medium 208, system 200 may include any number of memories 206 and storage media 208. Further, although FIG. 2 shows memory 206 and storage medium 208 as part of system 200, memory 206 and/or storage medium 208 may be located separately or remotely and system 200 may be able to access memory 206 and/or storage medium 208 via a wired or wireless connection (e.g., network 106).

System 200 may also include one or more displays 210 for displaying data and information. Display 210 may be implemented using devices or technology, such as a cathode ray tube (CRT) display, a liquid crystal display (LCD), a plasma display, a light emitting diode (LED) display, a touch screen type display, a projection system, and/or any other type of display known in the art.

System 200 may also include one or more communications interfaces 212. Communications interface 212 may allow software and/or data to be transferred between system 200, merchant system 110, sensor(s) 112, first device 102, second device 104, central database 114, and/or other components. Examples of communications interface 212 may include a modem, a network interface (e.g., an Ethernet card or a wireless network card), a communications port, a PCMCIA slot and card, a cellular network card, etc. Communications interface 212 may transfer software and/or data in the form of signals, which may be electronic, electromagnetic, optical, or other signals capable of being transmitted and received by communications interface 212. Communications interface 212 may transmit or receive these signals using wire, cable, fiber optics, radio frequency ("RF") link, Bluetooth link, and/or other communications channels.

System 200 may include one or more databases 214. In other embodiments, one or more databases 214 may be located remotely from the system 200, and system 200 may be configured to communicate with one or more databases 214 via the network 106. Database 214 may include one or more logically and/or physically separate databases configured to store data. The data stored in database 214 may be received from merchant system 110, from sensor(s) 112, from first device 102, from second device 104, and/or may be provided as input using conventional methods (e.g., data entry, data transfer, data uploading, etc.).

Similar to central database 114, database 214 may, for example, include Oracle™ databases, Sybase™ databases, or other relational databases or non-relational databases, such as Hadoop sequence files, HBase, or Cassandra. Central database 214 may include, for example, customer's preferred level of interaction, customer's interaction history with one or more agents, customer and sensor position data, sensor identifiers, merchandise identifiers, customer profiles, customer credentials, customer credit history, customer transaction history, information related to one or more items purchased or selected for purchase by one or more customers, financial information related to one or more financial accounts, and/or other financial data associated with one or more customers, etc. Additionally or alternatively, the data stored in the database 214 may take or represent various forms including, but not limited to, documents, presentations, spreadsheets, textual content, mapping and geographic information, rating and review information, pricing information, address information, profile information, information regarding sensor(s) 112, information regarding sensor(s) 204, audio files, video files, and a variety of other electronic data, or any combination thereof.

Central database 214 may be included in the system 200. Alternatively, central database 214 may be located remotely from the system 200. Central database 214 may include computing components (e.g., database management system, database server, etc.) configured to receive and process requests for data stored in memory devices of central database 214 and to provide data from central database 214.

In some embodiments, database 214 may be implemented using a single computer-readable storage medium. In other embodiments, database 214 may be maintained in a network attached storage device, in a storage area network, or combinations thereof, etc. Furthermore, database 214 may be maintained and queried using numerous types of database software and programming languages, for example, SQL, MySQL, IBM DB2®, Microsoft Access®, PERL, C/C++, Java®, etc.

Figure 3:
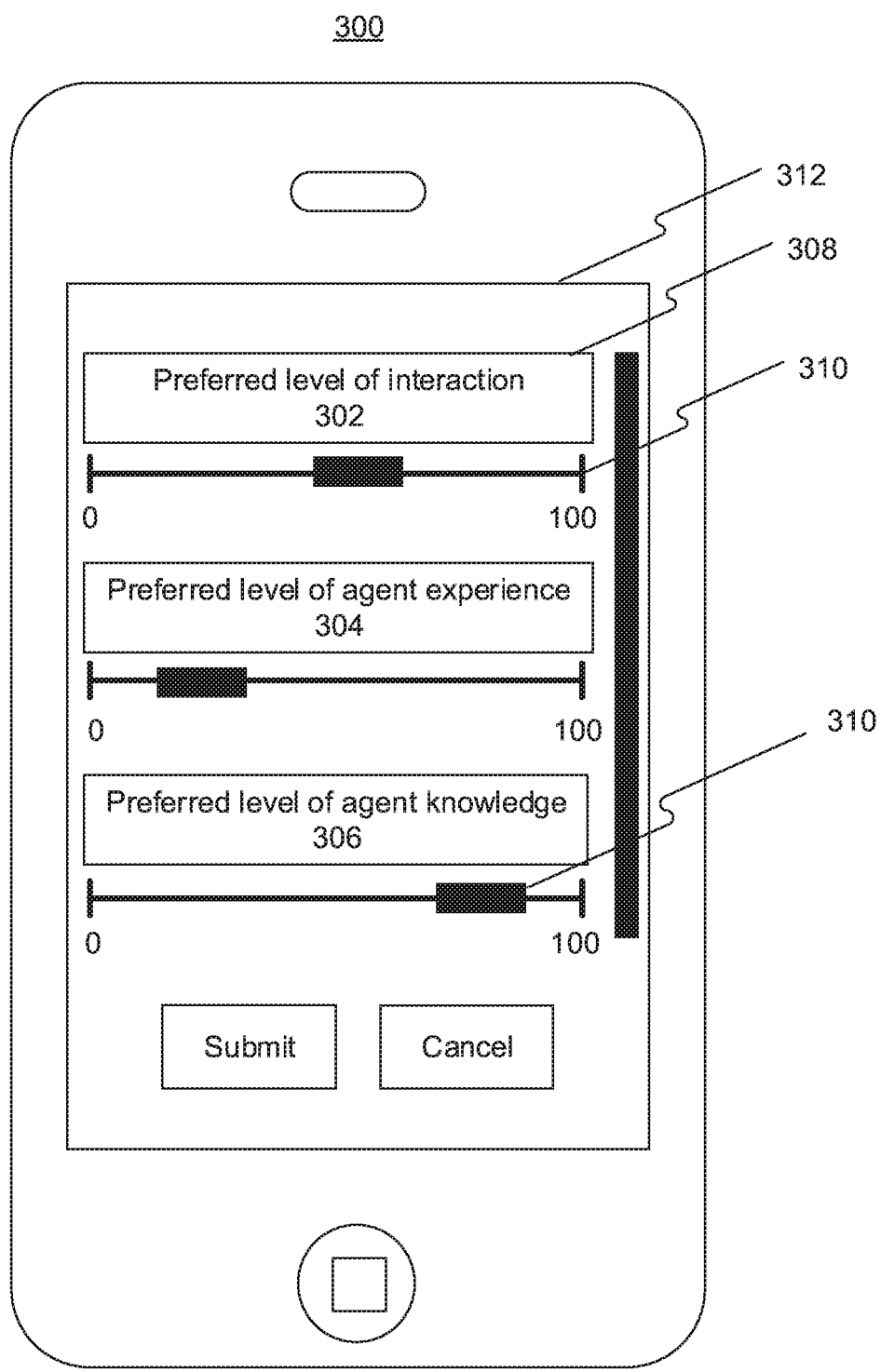
FIG. 3 shows an exemplary graphical user interface displayed on an exemplary mobile device in accordance with the embodiments of the present disclosure.

FIG. 3 illustrates an exemplary graphical user interface (GUI) 300 displayed on an exemplary device in accordance with the embodiments of the present disclosure. GUI 300 may be displayed on the first device 102 and/or the second device 104. As illustrated in FIG. 3, the GUI 300 may display one or more input requests 308 from the user associated with the first device 102. For example, the one or more input requests 308 may include a request for a preferred level of interaction 302, a request for a preferred level of agent experience 304, a request for a preferred level of agent knowledge 306.

While FIG. 3 only shows a request for a preferred level of interaction 302, a request for a preferred level of agent experience 304, and a request for a preferred level of agent knowledge 306, the one or more input requests 308 are not limited to these requests. For example, one or more input requests 308 may further include a request for the user's merchant-level communication preference setting. By way of example, based on the location of the user, one or more processors 202 may determine the merchant 108 associated with the store, in which the user is present. One or more processors 202 may prompt the user to input the user's communication preference setting for this specific merchant 108 on the GUI 300. As such, the user may be able to input the user's communication preference setting (i.e. user's preference on interaction with sales associates associated with merchant 108) on the GUI 300. One or more processors 202 may store the user's merchant-level communication preference settings associated with one or more merchants 108 in the central database 114, 214. Additionally or alternatively, one or more processors 202 may be able to access the central database 114, 214 in order to determine the user's previously stored merchant-level communication preference settings corresponding to one or more merchants 108 such that the user's merchant-level communication preference setting may be automatically determined in response to detecting a presence of the user. For example, in response to one or more sensor(s) 204 recognizing a presence of the user in a store associated with merchant 108, one or more processors may send instructions to the first device 102 and/or the second device 104 to cause the device to access the user's merchant-level communication preference setting associated with merchant 108. The user's merchant-level communication preference setting may be displayed on the GUI 300 of the first device 102 and/or the second device 104.

Below each of the one or more input requests 308, the GUI 300 may display one or more sliders 310. The user may be able to adjust the position of the sliders 310 to a value between 1 and 100. The value may be indicative of the user's preferred level of interaction 302, the user's preferred level of agent experience 304, and/or the user's preferred level of agent knowledge 306. While FIG. 3 displays a value between 1 and 100, any other values may be displayed on GUI 300. In addition, other user input requests 308 may be displayed on GUI 300.

Although GUI elements 310 have been referred to as sliders, it is contemplated that element 310 may be a button, a universal resource locator (URL), a checkbox, a radio button, or any other GUI element well-known in the art for displaying an image and receiving input. In addition, GUI elements 310 may include, for example, windows, menus, drop-down lists, controls, text boxes, scroll bars, or any other GUI elements well-known in the art. The user associated with the device may manipulate, select, or provide input by clicking, tapping, manipulating, and/or entering data in one or more GUI elements of GUI 300 using one or more I/O devices (not shown).

As illustrated in FIG. 3, GUI 300 may also include "Submit" or "Cancel" buttons, which may allow the user to indicate that the user has finished entering user inputs for one or more input requests 308 displayed in GUI 500.

Figure 4:
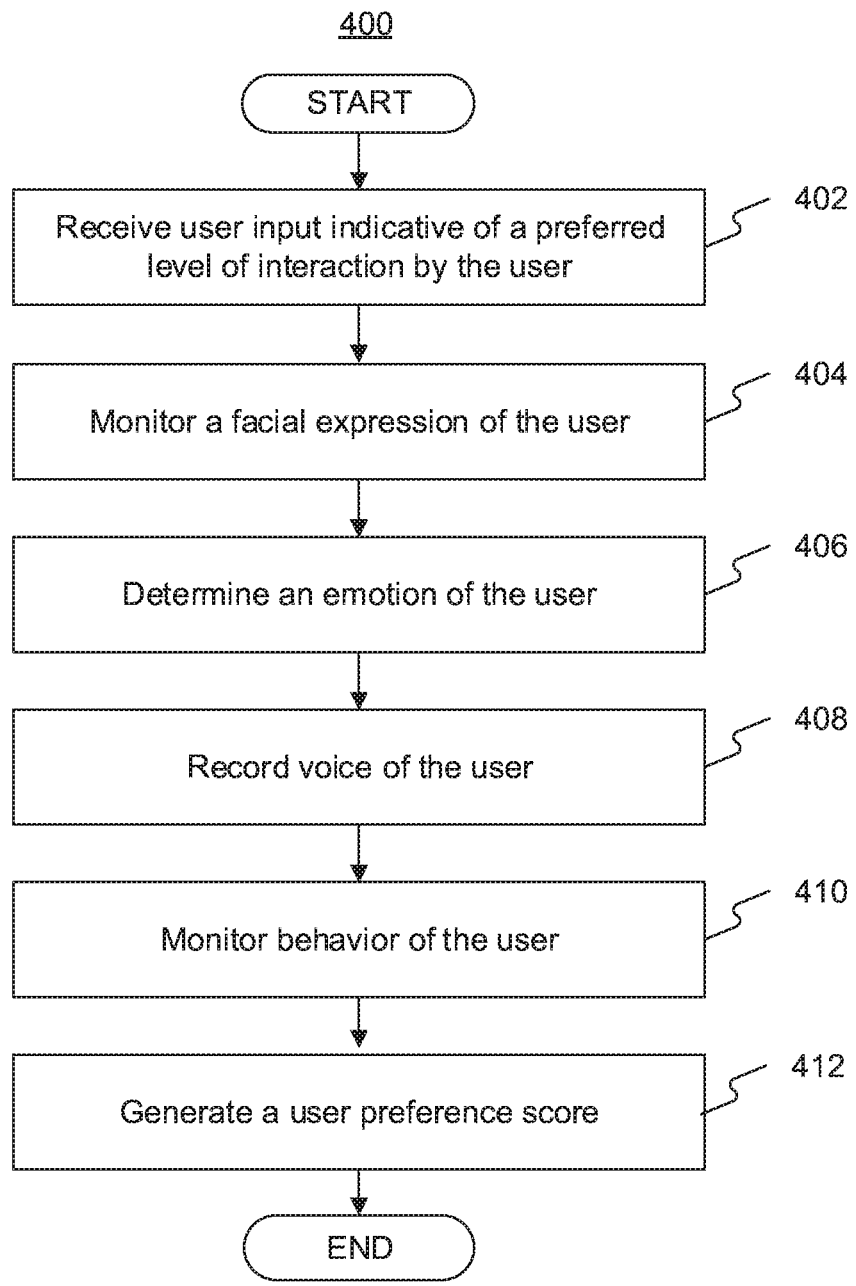
FIG. 4 shows a block diagram of an exemplary process of providing customized user experience in accordance with the embodiments of the present disclosure.

FIG. 4 is a flowchart of an exemplary process 400 for providing a customized user experience during a visit to a store associated with, for example, merchant 108. Process 400 may be implemented, for example, on first device 102, second device 104, and/or merchant system 110 with or without communications with central database 114 via network 106. The order and arrangement of steps in process 400 is provided for purposes of illustration. As will be appreciated from this disclosure, modifications may be made to process 400 by, for example, adding, combining, removing, and/or rearranging one or more steps of process 400. It is contemplated that in performing process 400, notifications, information, message, images, graphical user interface, etc. may be displayed, for example, on first device 102, second device 104, and/or merchant system 110. Further, it is contemplated that in performing process 400, users may make one or more selections from a GUI displayed on display 210 or enter one or more items of information or data using I/O devices associated with the first device 102. In addition, it is contemplated that in performing process 400, information or data may be accessed, retrieved, or stored in one or more of memory 206, storage medium 208, or database 114, 214. One or more of memory 206, storage medium 208, or database 114, 214, by way of example, may be associated with one or more of sensor(s) 204, first device 102, second device 104, and/or merchant system 110.

As shown in FIG. 4, process 400 may include a step 402 of receiving user input indicative of a preferred level of interaction by the user. In some embodiments, the user may be prompted on the first device 102 to provide a user input indicative of a preferred level of interaction by the user. Step 402 may be performed before or after a user enters a store associated with a merchant 108, for example. In one exemplary embodiment, a presence of the user may be detected by one or more sensor(s) 204, and the one or more processors 202 may automatically receive user input from a central database 214 via network 106. In another embodiment, a presence of the user may be detected by sensor(s) 204 and an agent may use the second device 104 to request user input from the central database 214 via network 106. As such, the user input may be received automatically upon detection of user presence or the user input may be manually requested.

A presence of the user may be detected in many ways. In one exemplary embodiment, the first device 102 associated with a user may transmit a signal, which may be received by sensor(s) 112 associated with a merchant 108. The signal transmitted by the first device 102 may be a near-field signal, for example, a Bluetooth signal or an RFID signal, which may be receivable only by sensor(s) 112 located in the vicinity of the first device 102. A location of the first device 102 may be determined as a location of the sensor 112 that detects the near-field signal transmitted by the first device 102. As used in this disclosure, sensor(s) 112 may be determined as being located in the vicinity of the first device 102 when sensor(s) 112 are positioned near the first device 102 at a threshold distance from a position of the first device 102. In one exemplary embodiment, the threshold distance may be of the order of a few inches, for example, 2 to 5 inches. In another exemplary embodiment, the threshold distance may be half the distance between sensor(s) 112. The location of the first device 102 may be transmitted to the second device 104 via network 106.

In another exemplary embodiment, the first device 102 may receive signals from one or more sensor(s) 112. The first device 102 may extract information regarding sensor(s) 112 from the received signals. In some exemplary embodiments, the information contained in signals transmitted by sensor(s) 112 may include a Bluetooth identifier, Bluetooth profile, sensor identifier, and/or sensor position. The sensor identifier of each sensor 112 may be stored in association with a known position of sensor 112 in memory 206, storage medium 208, and/or central database 114, 214. The first device 102 may retrieve a position or sensor identifier of sensor 112 located near the first device 102 based on the stored information. In another exemplary embodiment, the first device 102 may transmit some or all of the extracted information to merchant system 110 through network 106. Merchant system 110, may retrieve a position or sensor identifier of sensor 112 located near the first device 102 based on information stored in memory 206, storage medium 208, and/or central database 114, 214 and transmit the position or sensor identifier to the second device 104 through network 106.

In yet another exemplary embodiment, each sensor 112 may include a transmitter and a receiver. A signal may be continuously transmitted by each transmitter and received by its corresponding receiver. Presence of the user and/or the first device 102 associated with the user near sensor 112 may interrupt the signal from being transmitted by a transmitter associated with sensor 112 or from being received by a corresponding receiver associated with sensor 112. Interruption of the transmission or reception of the signal may be used to identify sensor 112 located near the user or the first device 102 associated with the user.

In yet another exemplary embodiment, the first device 102 associated with the user may receive signals transmitted by one or more sensors 112. The first device 102 may determine a strength of each received signal. The first device 102 may combine the signal strengths with known positions of sensors 112 to determine the location of the first device 102 in or near the store using triangulation techniques.

Once the presence of the first device 102 associated with the user is detected, the second device 104, for example, may receive user input indicative of a preferred level of interaction by the user. In other embodiments, the second device 104 may receive other information associated with the user's preference. For example, the second device 104 may receive information associated with the user's preferred level of agent experience or the user's preferred level of user knowledge. Alternatively, once the presence of the first device 102 associated with the user is detected, the merchant system 110 may receive user input indicative of a preferred level of interaction by the user. In other embodiments, the merchant system 110 may receive other information associated with the user's preference. For example, the merchant system 110 may receive information associated with the user's preferred level of agent experience or the user's preferred level of user knowledge. The merchant system 110 may be configured to communicate the user input and other information to the second device 104.

Once the user input indicative of the user's preferred level of interaction is received, process 400 may proceed to step 404 of monitoring a facial expression of the user. A facial expression of the user may, for example, be monitored using one or more sensor(s) 204 located on the walls. In a preferred embodiment, a facial expression of the user may be monitored using one or more sensor(s) 204 associated with the second device 104 of an agent. For example, the agent may approach the user and monitor the facial expression of the user via one or more sensor(s) 204 located on the second device 104. In some embodiments, the second device 104 may be a smartphone, a tablet, a virtual reality headset, and/or other wearable devices. One or more image sensor(s), such as cameras, may be located on the second device 104 in order to monitor the facial expression of the user. In other embodiments, the agent may not need to approach the user in order to monitor the user's facial expression. For example, the agent may be able to monitor the facial expression of the user from a distance if the user's preferred level of interaction is below a predetermined threshold. The second device 102 may comprise one or more processors 202 that can process the facial expression of the user and store information associated with the facial expression of the user in a central database 114, 214 via network 106.

Once a facial expression of the user is monitored in step 404, process 400 may proceed to step 406 of determining an emotion of the user. The process of determining an emotion of the user will be discussed in more detail below with respect to FIG. 6. Once an emotion of the user is determined in step 406, process 400 may proceed to step 408 of recording a voice of the user. As discussed above, the second device 104 may include one or more sensor(s) 204, such as one or more audio sensors, configured to record a voice of the user associated with the first device 102. For example, a microphone may be located on the second device 104 such that, when an agent approaches the user, the microphone can record a conversation between the agent and the user. As such, the microphone can record a voice of the user. The recording of the user's voice may be stored in the central database 114, 214 via network 106.

Once the voice of the user is recorded and stored, process 400 may proceed to step 410 of monitoring the behavior of the user. The behavior of the user can be done in many ways. In one exemplary embodiment, one or more sensor(s) located on the second device 104 associated with the agent may monitor the behavior of the user. For example, one or more image sensors associated with the second device 104 may capture images or record videos of the user's behavior. The monitored user behavior may be stored in the central database 114, 214 via network 106. In another embodiment, one or more sensor(s) 112 associated with a merchant 108 and/or merchant system 110 may be configured to monitor the behavior of the user. For example, one or more sensor(s) 112 associated with a merchant 108 and/or merchant system 110 may include one or more image sensors configured to capture images or record videos of customers in a store. As such, the image sensor(s) may be configured to monitor user behavior by capturing images or recording videos of the user's behavior of movement. The image sensors may be configured to capture images or record videos in real-time.

As illustrated in FIG. 4, process 400 may proceed to step 412 of generating a user preference score. The user preference score generated may be based on one or more of the received user input in step 402, monitored facial expression in step 404, determined emotion of the user in step 406, recorded voice of the user in step 408, and/or monitored behavior of the user in step 410. One or more processors 202 associated with the second device 104 may be configured to aggregate one or more of the aforementioned information associated with the user from the central database 114, 214 via network 106 and be configured to calculate a preference score associated with the user. By way of example, the received user input in step 402, monitored facial expression in step 404, determined emotion of the user in step 406, recorded voice of the user in step 408, and monitored behavior of the user in step 410 may each comprise a value between 1 and 100. One or more processors 202 may aggregate these values by adding them and/or by calculating an average of the values. Alternatively or additionally, the values may be weighted. For example, one or more processors 202 may access the central database 114, 214 that may store a predetermined hierarchy of values. In the predetermined hierarchy, the received user input may be ranked higher than the emotion of the user but lower than the facial expression of the user. Based on the predetermined hierarchy and ranking, the values may be weighted differently. For example, the higher the ranking of the value in the predetermined hierarchy, the value may be weighted more than other values that are ranked lower in the hierarchy. Central database 114, 214 may also store a look-up table of predetermined weights for each of the values based on the ranking in the predetermined hierarchy. The generated preference score associated with the user may be indicative of the user's desired level of interaction between the user and the agent.

After generating a user preference score, a customer service experience of the user may be modified based on the generated user preference score. For example, one or more processors 202 may be configured to compare the generated user preference score to a predetermined threshold and notify the agent to provide a certain level of interaction with the user. If the generated user preference score is 10 (on a scale of 0 to 100), for example, the user may not want to interact with any agents while shopping in a store associated with merchant 108. As such, the agent may be notified not to approach the user or to only approach the user when the user is actively seeking assistance. If, however, the generated user preference score is 90, the user may want to interact with many agents. As such, the agent may be notified to interact with the user and provide active assistance to the user. The agent may be notified in many ways. In one exemplary embodiment, the one or more processors 202 may be configured to generate a notification or a message for display on the second device 104 associated with the agent. The notification or the message may be displayed on the second device 104 via a GUI displayed on the display 210 of the second device 104.

Figure 5:
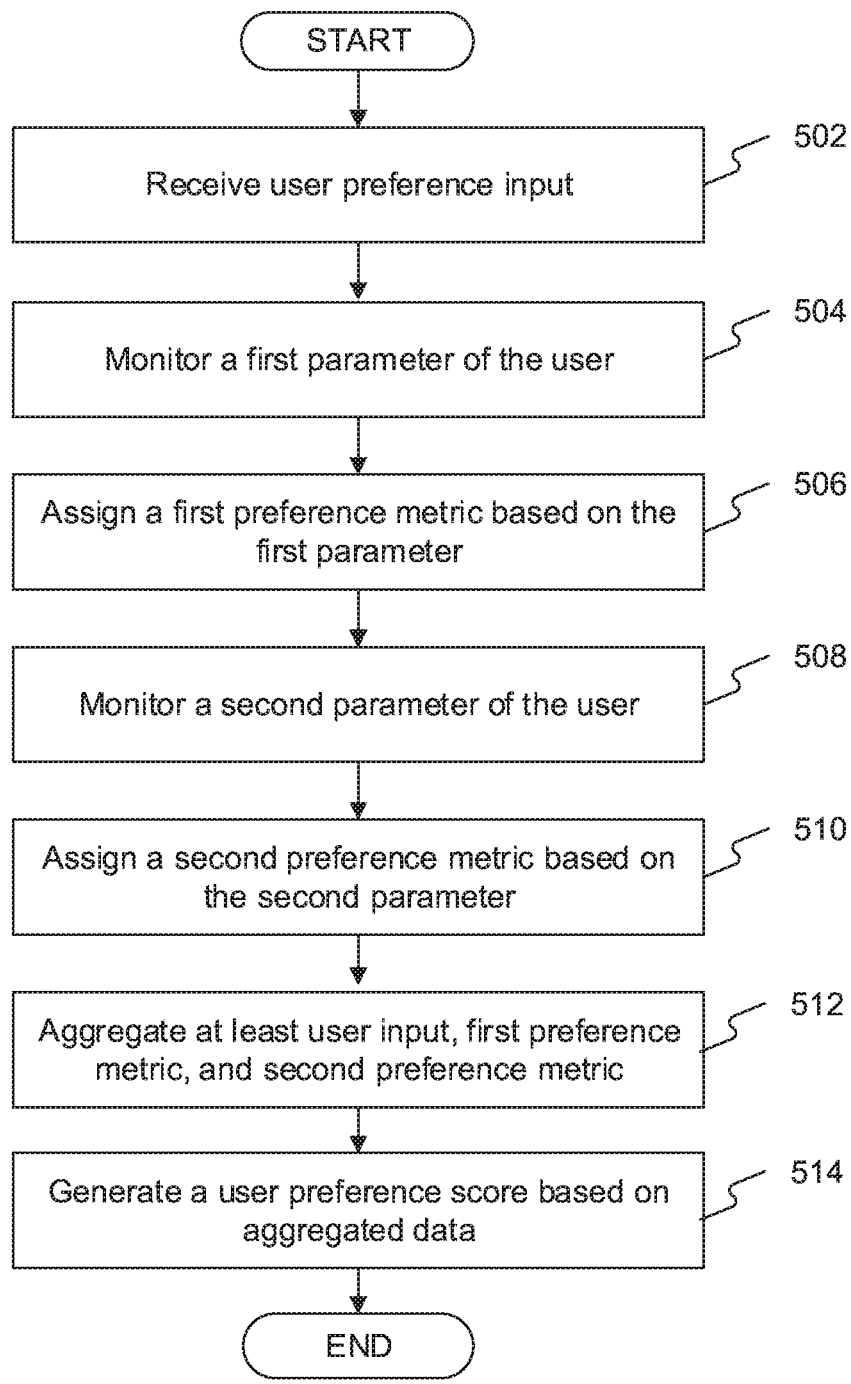
FIG. 5 shows a block diagram of an exemplary process of generating a preference score associated with a user in accordance with the embodiments of the present disclosure.

FIG. 5 is a flowchart of an exemplary process 500 for generating a user preference score in order to provide a customized user experience during a visit to a store associated with, for example, merchant 108. Process 500 may be implemented, for example, on first device 102, second device 104, and/or merchant system 110 with or without communications with central database 114 via network 106. The order and arrangement of steps in process 500 is provided for purposes of illustration. As will be appreciated from this disclosure, modifications may be made to process 500 by, for example, adding, combining, removing, and/or rearranging one or more steps of process 500. It is contemplated that in performing process 500, notifications, information, message, images, graphical user interface, etc. may be displayed, for example, on first device 102, second device 104, and/or merchant system 110. Further, it is contemplated that in performing process 500, users may make one or more selections from a GUI displayed on display 210 or enter one or more items of information or data using I/O devices associated with the first device 102. In addition it is contemplated that in performing process 500, information or data may be accessed, retrieved, or stored in memory 206, storage medium 208, and/or database 114, 214 associated with one or more of sensor(s) 204, first device 102, second device 104, and/or merchant system 110.

As shown in FIG. 5, process 500 may include a step 502 of receiving user input indicative of a preferred level of interaction by the user. Step 502 may be performed before, during, or after a user enters a store associated with a merchant 108, for example. In one exemplary embodiment, a presence of the user may be detected by one or more sensor(s) 204, and the one or more processors 202 may automatically receive user input from a central database 214 via network 106. In another embodiment, a presence of the user may be detected by sensor(s) 204 and an agent may use the second device 104 to request user input from the central database 214 via network 106. As such, the user input may be received automatically upon detection of user presence or the user input may be manually requested.

A presence of the user may be detected in many ways. In one exemplary embodiment, the first device 102 associated with a user may transmit a signal, which may be received by sensor(s) 112 associated with a merchant 108. The signal transmitted by the first device 102 may be a near-field signal, for example, a Bluetooth signal or an RFID signal, which may be receivable only by sensor(s) 112 located in the vicinity of the first device 102. A location of the first device 102 may be determined as a location of the sensor 112 that detects the near-field signal transmitted by the first device 102. As used in this disclosure, sensor(s) 112 may be determined as being located in the vicinity of the first device 102 when sensor(s) 112 are positioned near the first device 102 at a threshold distance from a position of the first device 102. In one exemplary embodiment, the threshold distance may be of the order of a few inches, for example, 2 to 5 inches. In another exemplary embodiment, the threshold distance may be half the distance between sensor(s) 112. The location of the first device 102 may be transmitted to the second device 104 via network 106.

In another exemplary embodiment, the first device 102 may receive signals from one or more sensor(s) 112. The first device 102 may extract information regarding sensor(s) 112 from the received signals. In some exemplary embodiments, the information contained in signals transmitted by sensor(s) 112 may include a Bluetooth identifier, Bluetooth profile, sensor identifier, and/or sensor position. The sensor identifier of each sensor 112 may be stored in association with a known position of sensor 112 in memory 206, storage medium 208, and/or central database 114, 214. The first device 102 may retrieve a position or sensor identifier of sensor 112 located near the first device 102 based on the stored information. In another exemplary embodiment, the first device 102 may transmit some or all of the extracted information to merchant system 110 through network 106. Merchant system 110, may retrieve a position or sensor identifier of sensor 112 located near the first device 102 based on information stored in memory 206, storage medium 208, and/or central database 114, 214 and transmit the position or sensor identifier to the second device 104 through network 106.

In yet another exemplary embodiment, each sensor 112 may include a transmitter and a receiver. A signal may be continuously transmitted by each transmitter and received by its corresponding receiver. Presence of the user and/or the first device 102 associated with the user near sensor 112 may interrupt the signal from being transmitted by a transmitter associated with sensor 112 or from being received by a corresponding receiver associated with sensor 112. Interruption of the transmission or reception of the signal may be used to identify sensor 112 located near the user or the first device 102 associated with the user.

In yet another exemplary embodiment, the first device 102 associated with the user may receive signals transmitted by one or more sensors 112. The first device 102 may determine a strength of each received signal. The first device 102 may combine the signal strengths with known positions of sensors 112 to determine the location of the first device 102 in or near the store using triangulation techniques.

Once the presence of the first device 102 associated with the user is detected, the second device 104, for example, may receive user input indicative of a preferred level of interaction by the user. In other embodiments, the second device 104 may receive other information associated with the user's preference. For example, the second device 104 may receive information associated with the user's preferred level of agent experience or the user's preferred level of user knowledge.

Once the user input indicative of the user's preferred level of interaction is received, process 500 may proceed to step 504 of monitoring a first parameter of the user. The first parameter of the user may include, but is not limited to, a facial expression of the user, a behavior of the user, a movement of the user, an appearance of the user, and/or a voice of the user. A first parameter of the user may be monitored in various ways. For example, the first parameter of the user may be monitored using one or more sensor(s) 204 associated with the second device 104 of an agent. For example, the agent may approach the user and monitor the first parameter of the user via one or more sensor(s) 204 located on the second device 104. In some embodiments, the second device 104 may be a smartphone, a tablet, a virtual reality headset, and/or other wearable devices. One or more image sensor(s), such as cameras, or one or more audio sensors, such as microphones, may be located on the second device 104 in order to monitor the first parameter of the user. In other embodiments, the agent may not need to approach the user in order to monitor the first parameter of the user. For example, the agent may be able to monitor the first parameter of the user from a distance if the user's preferred level of interaction is below a predetermined threshold. The second device 102 may comprise one or more processors 202 that can process the first parameter of the user and store information associated with the first parameter of the user in a central database 114, 214 via network 106.

Once the first parameter of the user is monitored in step 504, process 500 may proceed to step 506 of assigning a first preference metric based on the first parameter. By way of example, the first preference metric may be a value assigned, such as a number between 1 and 100. A preference metric value of 1 may indicate that the user does not want any interaction with retailers, whereas a preference metric value of 100 may indicate that the user wants interaction with retailers throughout the entire time the user is at a store associated with a merchant. One or more processors 202 associated with the second device 104 may be configured to compare the monitored first parameter of the user with similar parameters of other users stored in the central database 114, 214. For example, the one or more processors 202 may be able to access a look-up table of preference metric values corresponding to various first parameters of users stored in the central database 114, 214. Based on the comparison, the one or more processors 202 may be configured to match the first parameter with similar, corresponding parameter in the look-up table and be configured to assign a corresponding preference metric to the user.

Once a first preference metric is assigned to the user, process 500 may proceed to step 508 of monitoring a second parameter of the user. Similar to step 504, a second parameter of the user may be monitored in various ways. The second parameter of the user may include, but is not limited to, a facial expression of the user, a behavior of the user, a movement of the user, an appearance of the user, and/or a voice of the user. The second parameter of the user may be monitored, for example, using one or more sensor(s) 204 associated with the second device 104 of an agent. For example, the agent may approach the user and monitor the second parameter of the user via one or more sensor(s) 204 located on the second device 104. In some embodiments, the second device 104 may be a smartphone, a tablet, a virtual reality headset, and/or other wearable devices. One or more image sensor(s), such as cameras, or one or more audio sensors, such as microphones, may be located on the second device 104 in order to monitor the second parameter of the user. In other embodiments, the agent may not need to approach the user in order to monitor the second parameter of the user. For example, the agent may be able to monitor the second parameter of the user from a distance if the user's preferred level of interaction is below a predetermined threshold.

In another embodiment, the second parameter may be a behavior of the user. The behavior of the user can be monitored in various ways. In one exemplary embodiment, one or more sensor(s) located on the second device 104 associated with the agent may monitor the behavior of the user. For example, one or more image sensors associated with the second device 104 may capture images or record videos of the user's behavior. The monitored user behavior may be stored in the central database 114, 214 via network 106. In another embodiment, one or more sensor(s) 112 associated with a merchant 108 and/or merchant system 110 may be configured to monitor the behavior of the user. For example, one or more sensor(s) 112 associated with a merchant 108 and/or merchant system 110 may include one or more image sensors configured to capture images or record videos of customers in a store. As such, the image sensor(s) may be configured to monitor user behavior by capturing images or recording videos of the user's behavior of movement. The image sensors may be configured to capture images or record videos in real-time. The second device 102 may comprise one or more processors 202 that can process the second parameter of the user and store information associated with the first parameter of the user in a central database 114, 214 via network 106.

Once the second parameter of the user is monitored in step 508, process 500 may proceed to step 510 of assigning a second preference metric based on the second parameter. Similar to the first preference metric, the second preference metric may be a value assigned, such as a number between 1 and 100. A preference metric value of 1 may indicate that the user does not want any interaction with retailers, whereas a preference metric value of 100 may indicate that the user wants interaction with retailers throughout the entire time the user is at a store associated with a merchant. One or more processors 202 associated with the second device 104 may be configured to compare the monitored second parameter of the user with similar parameters of other users stored in the central database 114, 214. For example, the one or more processors 202 may be able to access a look-up table of preference metric values corresponding to various second parameters of users stored in the central database 114, 214. Based on the comparison, the one or more processors 202 may be configured to match the second parameter with similar, corresponding parameter in the look-up table and be configured to assign a corresponding preference metric to the user based on the second parameter. Steps 504-510 may be repeated one or more times in order to determine one or more additional parameters.

As illustrated in FIG. 5, process 500 may proceed to step 512 of aggregating at least the user input, the first preference metric, and the second preference metric. For example, one or more processors 202 associated with the second device 104 may be configured to aggregate the user input in step 502, the first preference metric assigned in step 506, and the second preference metric assigned in step 510 from the central database 114, 214 via network 106 and be configured to aggregate the values to calculate a preference score associated with the user. By way of example, the values may be added, weighted, etc. to calculate a preference score associated with the user. In other embodiments, one or more processors 202 may access a look-up table stored in the central database 114, 214 in order to determine the appropriate weights to be placed on each value calculated. The generated preference score associated with the user may be indicative of the user's desired level of interaction between the user and the agent.

After aggregating at least the user input, the first preference metric, and the second preference metric, process 500 may proceed to step 514 of modifying customer service experience based on the aggregated data. For example, one or more processors 202 may be configured to compare the aggregated data to a predetermined threshold and notify the agent to provide a certain level of interaction with the user. If the aggregated data displays a score of 10 (on a scale of 0 to 100), for example, the user may not want to interact with any agents while shopping in a store associated with merchant 108. As such, the agent may be notified not to approach the user or to only approach the user when the user is actively seeking assistance. If, however, the aggregated data displays a score of 90, the user may want to interact with many agents. As such, the agent may be notified to interact with the user and provide active assistance to the user. The agent may be notified in many ways. In one exemplary embodiment, the one or more processors 202 may be configured to generate a notification or a message for display on the second device 104 associated with the agent. The notification or the message may be displayed on the second device 104 via a GUI displayed on the display 210 of the second device 104.

Figure 6:
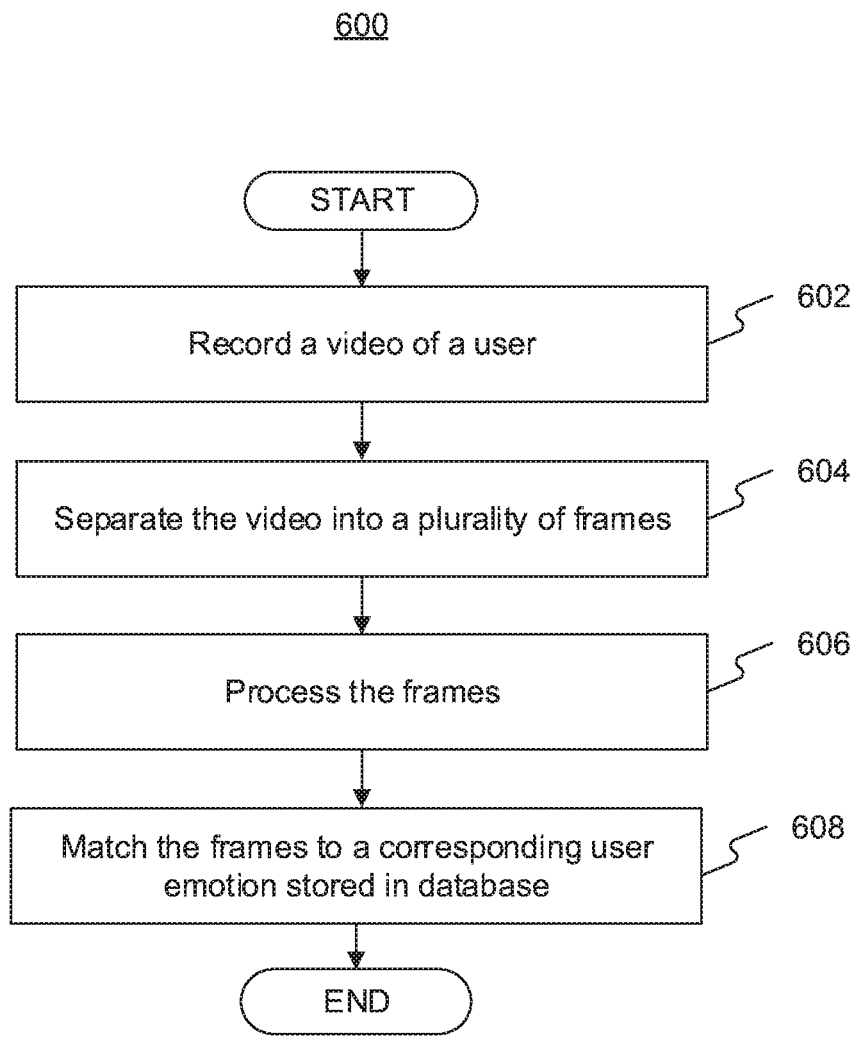
FIG. 6 shows a block diagram of an exemplary process of monitoring a facial expression of the user in accordance with the embodiments of the present disclosure.

FIG. 6 is a flowchart of an exemplary process 600 for determining an emotion of the user in accordance with the embodiments of the present disclosure. Process 600 may be implemented, for example, on first device 102, second device 104, and/or merchant system 110 with or without communications with central database 114 via network 106. The order and arrangement of steps in process 600 is provided for purposes of illustration. As will be appreciated from this disclosure, modifications may be made to process 600 by, for example, adding, combining, removing, and/or rearranging one or more steps of process 600. It is contemplated that in performing process 600, notifications, information, message, images, graphical user interface, etc. may be displayed, for example, on first device 102, second device 104, and/or merchant system 110. Further, it is contemplated that in performing process 600, users may make one or more selections from a GUI displayed on display 210 or enter one or more items of information or data using I/O devices associated with the first device 102. In addition it is contemplated that in performing process 600, information or data may be accessed, retrieved, or stored in memory 206, storage medium 208, and/or database 114, 214 associated with one or more of sensor(s) 204, first device 102, second device 104, and/or merchant system 110.

As show in FIG. 6, process 600 may include a step 602 of recording a video of the user. Recording a video of the user may be done in various ways. The video may be recorded using one or more sensor(s) 112, 204 associated with a first device 102, second device 104, and/or merchant system 110. One or more sensor(s) 112, 204 may be one or more image sensors, such as a video camera, digital camera, Charged Couple Device (CCD) camera, an image camera, Universal Serial Bus (USB) camera, video cards with composite or S-video devices and other such camera which is capable of capturing video frames of users. The one or more sensor(s) 112, 204 may capture images of the user for 'n' number of times or 'n' frames per second for a predetermined period of time. One or more processor(s) 202 may be configured to vary the capture rate of the one or more sensor(s) based on the movement of the user. For example, if the user appears to be less active, the capture rate of the one or more sensor(s) may be decreased to conserve power and increase efficiency. On the other hand, if the user appears to be more active, the capture rate of the one or more sensor(s) may be increased to improve accuracy.

Once the images are captured and a video of the user is recorded, process 600 may proceed to step 604 of separating the video into a plurality of frames. For example, the one or more processor(s) 202 may be configured to process the recorded video of the user in order to separate the video into a plurality of frames of images captured. As such, the one or more processor(s) 202 may be configured to analyze each of the plurality of frames separately to observe any changes in the user's physiological parameter of interest. In some embodiments, the one or more processor(s) 202 may be configured to selectively choose a predetermined number of frames to be analyzed instead of analyzing each of the frames in order to increase efficiency. The number of frames selectively chosen for analysis may be based on the user's activity level.

Then, process 600 may proceed to step 606 of processing the frames chosen. For example, the one or more processor(s) 202 may be configured to analyze variations in the captured frames of the user, such as pixel variations, color variations, etc. In one exemplary embodiment, a color histogram of the user may be generated based on a sequence of the plurality of frames captured. Based on the color histogram and any variations thereof over time, the one or more processor(s) 202 may be configured to determine a physiological characteristic of the user, such as a facial expression, behavior, or movement of the user.

In another embodiment, the one or more processor(s) 202 may be configured to process the plurality of frames using machine-learning algorithms, such as decision tree learning, deep learning, rule-based machine learning, Bayesian networks, etc. In one embodiment, one or more processor(s) 202 may be configured to apply deep learning algorithms to provide computer vision, process and analyze the plurality of image frames, and determine the facial expression of the user and/or the emotion of the user.

Process 600 may further proceed to step 608 of matching the analyzed frames to a corresponding user emotion stored in a database. The database may comprise the central database 114, 214. The central database 114, 214 may be configured to store predefined user emotions that correspond to various physiological characteristics determined from analyzing a plurality of image frames captured. For instance, the central database 114, 214 may comprise look-up tables of predefined user emotions corresponding to various physiological characteristics, such as certain variations in color histograms, color variations, pixel variations, etc. One or more processors(s) 202 may be configured to match the plurality of frames analyzed of the user to the closest frames stored in the central database 114, 214. Based on the matching, one or more processor(s) 202 may be configured to determine an emotion of the user that best corresponds to the plurality of frames associated with the user. The determined emotion of the user may be stored by the one or more processor(s) 202 in the central database 114, 214 via network 106.

Figure 7:
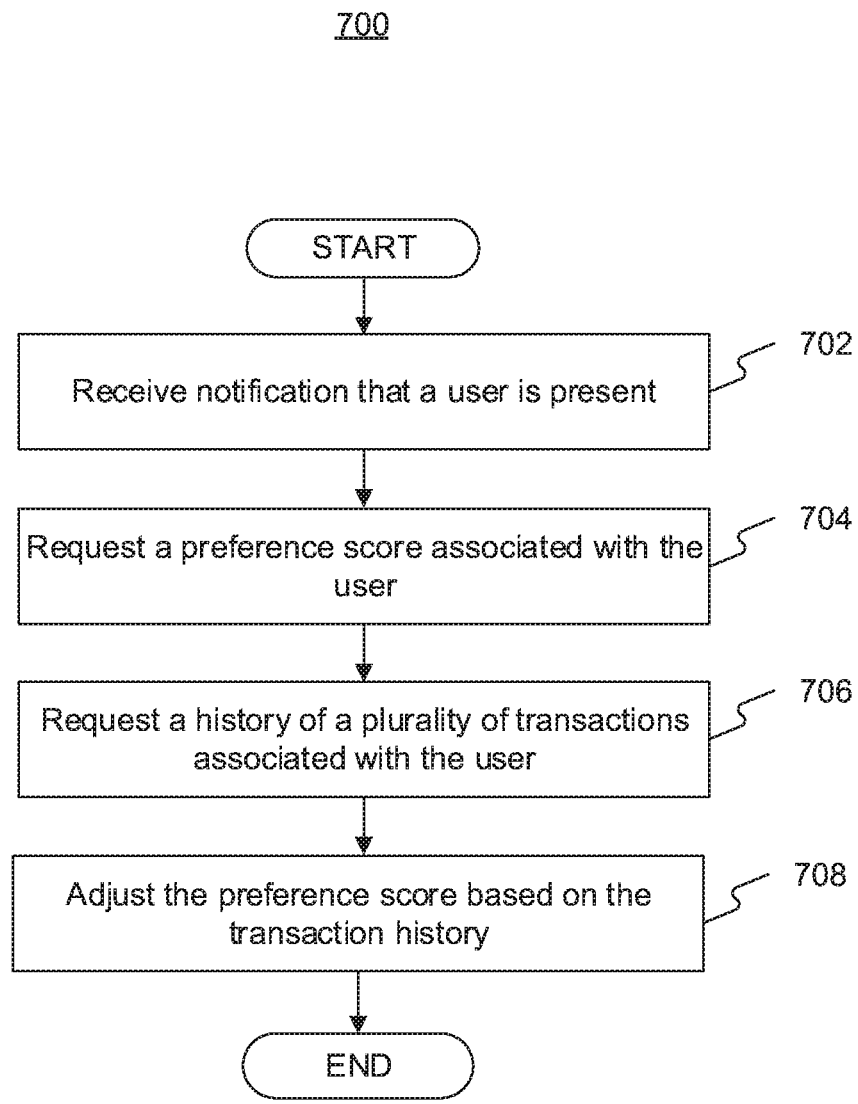
FIG. 7 shows another block diagram of an exemplary process of providing customized user experience in accordance with the embodiments of the present disclosure.

FIG. 7 is a flowchart of an exemplary process 700 for providing a customized user experience. Process 700 may be implemented, for example, on first device 102, second device 104, and/or merchant system 110 with or without communications with central database 114 via network 106. The order and arrangement of steps in process 700 is provided for purposes of illustration. As will be appreciated from this disclosure, modifications may be made to process 700 by, for example, adding, combining, removing, and/or rearranging one or more steps of process 700. It is contemplated that in performing process 700, notifications, information, message, images, graphical user interface, etc. may be displayed, for example, on first device 102, second device 104, and/or merchant system 110. Further, it is contemplated that in performing process 700, users may make one or more selections from a GUI displayed on display 210 or enter one or more items of information or data using I/O devices associated with the first device 102. In addition it is contemplated that in performing process 700, information or data may be accessed, retrieved, or stored in memory 206, storage medium 208, and/or database 114, 214. Memory 206, storage medium 208, and/or database 114, 214 may be associated with one or more of sensor(s) 204, first device 102, second device 104, and/or merchant system 110.

As shown in FIG. 7, process 700 may include a step 702 of recognizing a presence of the user. In one exemplary embodiment, a presence of the user may be recognized by one or more sensor(s) 204. A presence of the user may be recognized in many ways. In one exemplary embodiment, the first device 102 associated with a user may transmit a signal, which may be received by sensor(s) 112 associated with a merchant 108. The signal transmitted by the first device 102 may be a near-field signal, for example, a Bluetooth signal or an RFID signal, which may be receivable only by sensor(s) 112 located in the vicinity of the first device 102. A location of the first device 102 may be determined as a location of the sensor 112 that detects the near-field signal transmitted by the first device 102. As used in this disclosure, sensor(s) 112 may be determined as being located in the vicinity of the first device 102 when sensor(s) 112 are positioned near the first device 102 at a threshold distance from a position of the first device 102. In one exemplary embodiment, the threshold distance may be of the order of a few inches, for example, 2 to 5 inches. In another exemplary embodiment, the threshold distance may be half the distance between sensor(s) 112. The location of the first device 102 may be transmitted to the second device 104 via network 106.

In another exemplary embodiment, the first device 102 may receive signals from one or more sensor(s) 112. The first device 102 may extract information regarding sensor(s) 112 from the received signals. In some exemplary embodiments, the information contained in signals transmitted by sensor(s) 112 may include a Bluetooth identifier, Bluetooth profile, sensor identifier, and/or sensor position. The sensor identifier of each sensor 112 may be stored in association with a known position of sensor 112 in memory 206, storage medium 208, and/or central database 114, 214. The first device 102 may retrieve a position or sensor identifier of sensor 112 located near the first device 102 based on the stored information. In another exemplary embodiment, the first device 102 may transmit some or all of the extracted information to merchant system 110 through network 106. Merchant system 110, may retrieve a position or sensor identifier of sensor 112 located near the first device 102 based on information stored in memory 206, storage medium 208, and/or central database 114, 214 and transmit the position or sensor identifier to the second device 104 through network 106.

In yet another exemplary embodiment, each sensor 112 may include a transmitter and a receiver. A signal may be continuously transmitted by each transmitter and received by its corresponding receiver. Presence of the user and/or the first device 102 associated with the user near sensor 112 may interrupt the signal from being transmitted by a transmitter associated with sensor 112 or from being received by a corresponding receiver associated with sensor 112. Interruption of the transmission or reception of the signal may be used to identify sensor 112 located near the user or the first device 102 associated with the user.

In yet another exemplary embodiment, the first device 102 associated with the user may receive signals transmitted by one or more sensors 112. The first device 102 may determine a strength of each received signal. The first device 102 may combine the signal strengths with known positions of sensors 112 to determine the location of the first device 102 in or near the store using triangulation techniques.

Once the presence of the user is recognized, process 700 may proceed to step 704 of requesting a preference score associated with the user. Step 704 of requesting a preference score associated with the user may be performed by the second device 104 and/or the merchant system 110. The second device 104, for example, may request a preference score associated with the user. In another embodiment, the preference score associated with the user may be automatically sent to the second device 104 from the central database 114, 214 upon recognition of user presence. As discussed in detail above, the preference score associated with the user may be based on user input indicative of the user's preferred level of interaction, the facial expression of the user monitored, the voice of the user recorded, the movement of the user monitored, the behavior of the user monitored, and/or any combination thereof.

Once the preference score associated with the user is requested and obtained in step 704, process 700 may proceed to step 706 of requesting a history of a plurality of transactions associated with the user. For example, central database 114, 214 or any other data storage in the system may be configured to store a history of a plurality of transactions associated with a plurality of the user. The transaction history may include, but is not limited to, credit history, purchase history, product history, merchant history, etc. In one exemplary embodiment, the transaction history associated with the user may include past purchases made by the user, the locations and merchants at which the past purchases were made, the date and time at which the past purchases were made, the degrees of assistance received prior to making past purchases, the amount of customer interaction prior to making past purchases, the amount of purchases made, the time spent prior to making purchases, etc. The central database 114, 214 may be configured to obtain some or all of the transaction history associated with the user from a financial service provider (not shown), a merchant 108, or any combination thereof.

Once the transaction history of the user is obtained in step 706, process 700 may proceed to step 708 of adjusting the preference score associated with the user based on the transaction history. In some embodiments, the one or more processor(s) 202 may add, subtract, and/or weight the preference score based on the transaction history of the user. For example, the one or more processor(s) 202 may be configured to adjust the preference score based on the transaction history of the user. In one exemplary embodiment, if the preference score associated with the user is 80, but the transaction history of the user indicates that the user spends very little time interacting with retailers, service providers, agents, etc. prior to making each purchase, the one or more processor(s) 202 may lower the preference score associated with the user to 65 based on the transaction history of the user. The customer service experience may be modified based on the adjusted preference score associated with the user. As such, the one or more processor(s) 202 may be able to calibrate the preference score associated with the user to improve accuracy and provide a customer user experience that is most accurately customized to the needs and preferences of the user.

Figure 8:
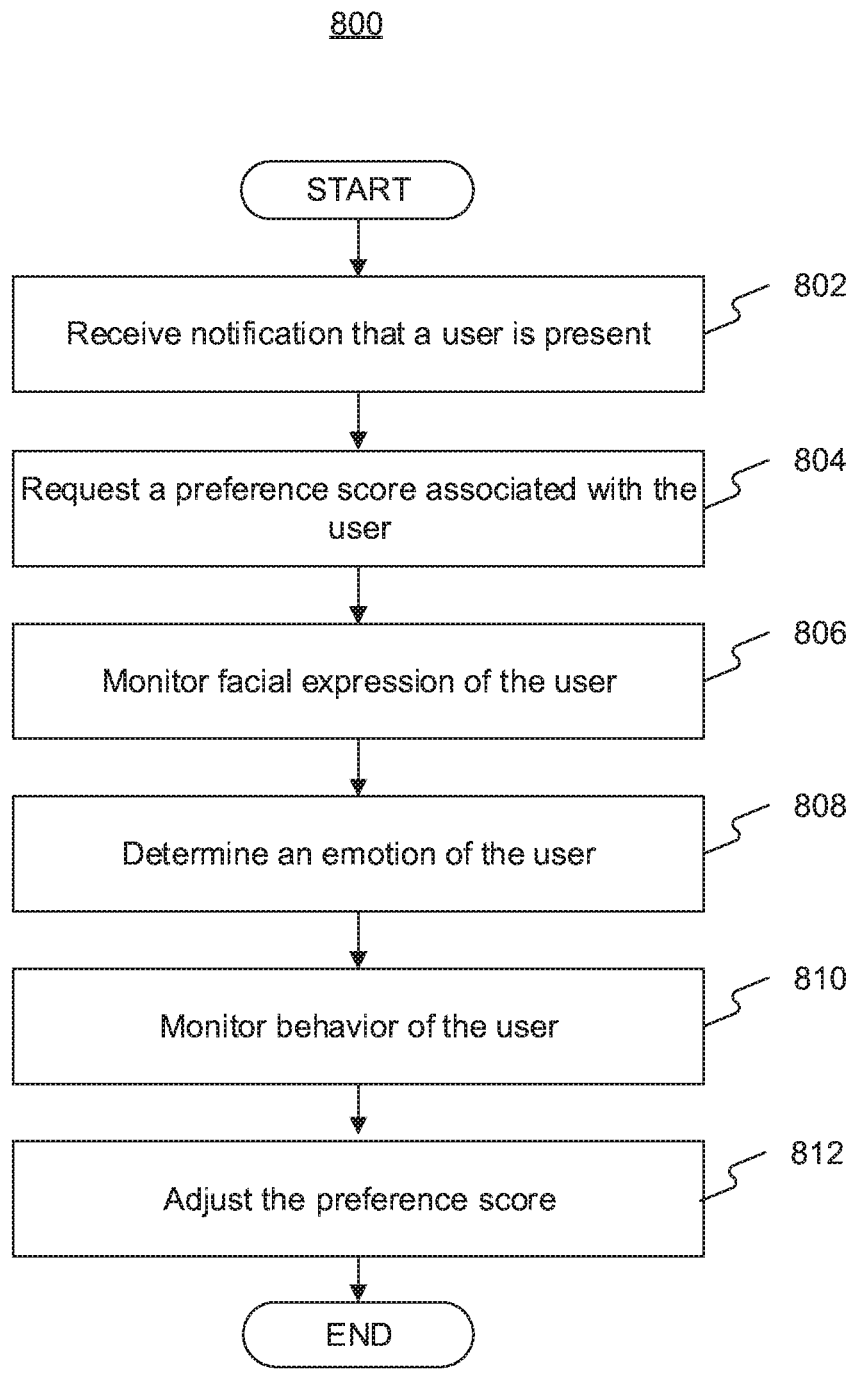
FIG. 8 shows another block diagram of an exemplary process of providing customized user experience in accordance with the embodiments of the present disclosure.

FIG. 8 is a flowchart of an exemplary process 800 for providing a customized user experience. Process 800 may be implemented, for example, on first device 102, second device 104, and/or merchant system 110 with or without communications with central database 114 via network 106. The order and arrangement of steps in process 800 is provided for purposes of illustration. As will be appreciated from this disclosure, modifications may be made to process 800 by, for example, adding, combining, removing, and/or rearranging one or more steps of process 800. It is contemplated that in performing process 800, notifications, information, message, images, graphical user interface, etc. may be displayed, for example, on first device 102, second device 104, and/or merchant system 110. Further, it is contemplated that in performing process 800, users may make one or more selections from a GUI displayed on display 210 or enter one or more items of information or data using I/O devices associated with the first device 102. In addition it is contemplated that in performing process 800, information or data may be accessed, retrieved, or stored in memory 206, storage medium 208, and/or database 114, 214 associated with one or more of sensor(s) 204, first device 102, second device 104, and/or merchant system 110.

As shown in FIG. 8, process 800 may include a step 802 of recognizing a presence of the user. In one exemplary embodiment, a presence of the user may be recognized by one or more sensor(s) 204. A presence of the user may be recognized in many ways. In one exemplary embodiment, the first device 102 associated with a user may transmit a signal, which may be received by sensor(s) 112 associated with a merchant 108. The signal transmitted by the first device 102 may be a near-field signal, for example, a Bluetooth signal or an RFID signal, which may be receivable only by sensor(s) 112 located in the vicinity of the first device 102. A location of the first device 102 may be determined as a location of the sensor 112 that detects the near-field signal transmitted by the first device 102. As used in this disclosure, sensor(s) 112 may be determined as being located in the vicinity of the first device 102 when sensor(s) 112 are positioned near the first device 102 at a threshold distance from a position of the first device 102. In one exemplary embodiment, the threshold distance may be of the order of a few inches, for example, 2 to 5 inches. In another exemplary embodiment, the threshold distance may be half the distance between sensor(s) 112. The location of the first device 102 may be transmitted to the second device 104 via network 106.

In another exemplary embodiment, the first device 102 may receive signals from one or more sensor(s) 112. The first device 102 may extract information regarding sensor(s) 112 from the received signals. In some exemplary embodiments, the information contained in signals transmitted by sensor(s) 112 may include a Bluetooth identifier, Bluetooth profile, sensor identifier, and/or sensor position. The sensor identifier of each sensor 112 may be stored in association with a known position of sensor 112 in memory 206, storage medium 208, and/or central database 114, 214. The first device 102 may retrieve a position or sensor identifier of sensor 112 located near the first device 102 based on the stored information. In another exemplary embodiment, the first device 102 may transmit some or all of the extracted information to merchant system 110 through network 106. Merchant system 110, may retrieve a position or sensor identifier of sensor 112 located near the first device 102 based on information stored in memory 206, storage medium 208, and/or central database 114, 214 and transmit the position or sensor identifier to the second device 104 through network 106.

In yet another exemplary embodiment, each sensor 112 may include a transmitter and a receiver. A signal may be continuously transmitted by each transmitter and received by its corresponding receiver. Presence of the user and/or the first device 102 associated with the user near sensor 112 may interrupt the signal from being transmitted by a transmitter associated with sensor 112 or from being received by a corresponding receiver associated with sensor 112. Interruption of the transmission or reception of the signal may be used to identify sensor 112 located near the user or the first device 102 associated with the user.

In yet another exemplary embodiment, the first device 102 associated with the user may receive signals transmitted by one or more sensors 112. The first device 102 may determine a strength of each received signal. The first device 102 may combine the signal strengths with known positions of sensors 112 to determine the location of the first device 102 in or near the store using triangulation techniques.

Once the presence of the user is recognized, process 800 may proceed to step 804 of requesting a preference score associated with the user. The second device 104, for example, may request a preference score associated with the user. In another embodiment, the preference score associated with the user may be automatically sent to the second device 104 from the central database 114, 214 upon recognition of user presence. As discussed in detail above, the preference score associated with the user may be based on user input indicative of the user's preferred level of interaction, the facial expression of the user monitored, the voice of the user recorded, the movement of the user monitored, the behavior of the user monitored, and/or any combination thereof.

Once the preference score associated with the user is requested and obtained in step 804, process 800 may proceed to step 806 of monitoring a facial expression of the user. A facial expression of the user may, for example, be monitored using one or more sensor(s) 204 associated with the second device 104 of an agent. For example, the agent may approach the user and monitor the facial expression of the user via one or more sensor(s) 204 located on the second device 104. In some embodiments, the second device 104 may be a smartphone, a tablet, a virtual reality headset, and/or other wearable devices. One or more image sensor(s), such as cameras, may be located on the second device 104 in order to monitor the facial expression of the user. In other embodiments, the agent may not need to approach the user in order to monitor the user's facial expression. For example, the agent may be able to monitor the facial expression of the user from a distance if the user's preferred level of interaction is below a predetermined threshold. The second device 102 may comprise one or more processors 202 that can process the facial expression of the user and store information associated with the facial expression of the user in a central database 114, 214 via network 106.

Once a facial expression of the user is monitored in step 806, process 800 may proceed to step 808 of determining an emotion of the user. The step of determining an emotion of the user is discussed in detail above with respect to FIG. 6.

Once the emotion of the user is determined in step 808, process 800 may proceed to step 810 of monitoring a behavior of the user. Monitoring the behavior of the user can be done in many ways. In one exemplary embodiment, one or more sensor(s) located on the second device 104 associated with the agent may monitor the behavior of the user. For example, one or more image sensors associated with the second device 104 may capture images or record videos of the user's behavior. The monitored user behavior may be stored in the central database 114, 214 via network 106. In another embodiment, one or more sensor(s) 112 associated with a merchant 108 and/or merchant system 110 may be configured to monitor the behavior of the user. For example, one or more sensor(s) 112 associated with a merchant 108 and/or merchant system 110 may include one or more image sensors configured to capture images or record videos of customers in a store. As such, the image sensor(s) may be configured to monitor user behavior by capturing images or recording videos of the user's behavior of movement. The image sensors may be configured to capture images or record videos in real-time.

As illustrated in FIG. 8, process 800 may proceed to step 812 of adjusting the preference score associated with the user based on at least one of the monitored facial expression of the user, the emotion of the user determined, or the behavior of the user. For example, the one or more processor(s) 202 may be configured to adjust the preference score based on at least one of the monitored facial expression of the user, the emotion of the user determined, or the behavior of the user. In one exemplary embodiment, if the preference score associated with the user is 80, but it is determined that the user is angry, the one or more processor(s) 202 may lower the preference score associated with the user to 50 based on the transaction history of the user. In another embodiment, if the preference score associated with the user is 30, but the monitored behavior of the user indicates that the user is wandering around the store seeking assistance, the preference score may be increased to indicate that the user is actively seeking interaction with agents. The customer service experience may be modified based on the adjusted preference score associated with the user. As such, the one or more processor(s) 202 may be able to calibrate the preference score associated with the user to improve accuracy and provide a customer user experience that is most accurately customized to the needs and preferences of the user.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A computer-implemented method of providing a customized user experience, the method comprising:
receiving information indicating a detected presence of a user;
based on the detected presence of the user, prompting the user to provide a preferred level of interaction, a preferred level of agent experience, and a preferred level of agent knowledge via a mobile device;
receiving, from a graphical user interface displayed on the mobile device, a user input indicative of the preferred level of interaction, the preferred level of agent experience, and the preferred level of agent knowledge;
requesting a history of a plurality of transactions associated with the user from a database, the history comprising a degree of interaction with agents prior to completing the plurality of transactions and an amount of time spent interacting with the agents prior to completing the plurality of transactions;
determining an emotion of the user, wherein determining the emotion of the user comprises:
recording, by a sensor, a video of the user;
separating the video into a plurality of video frames; and
matching ones of the video frames to frames of facial expressions stored in the database using a trained machine learning algorithm;
assigning a first preference metric based on the emotion;
recording, by a microphone, a voice of the user;
assigning a second preference metric based on the recorded voice;
aggregating the user input, the first preference metric, and the second preference metric to determine a first preference score representing a desired level of interaction of the user;
adjusting the first preference score based on the degree of interaction and the amount of time to generate a second preference score, the second preference score being higher than the first preference score and indicative of a higher level of desired interaction of the user; and
causing the second preference score to be displayed on an agent mobile device.

2. The computer-implemented method of claim 1, wherein the machine-learning algorithm comprises a deep learning algorithm trained to match the video frames to a corresponding user emotion.

3. The computer-implemented method of claim 1, wherein determining the first preference score comprises:
comparing the user input, first preference metric, and the second preference metric to a priority level hierarchy;
determining priority levels associated with the user input, first preference metric and the second preference metric; and
weighting the user input, the first preference metric and the second preference metric based on the determined priority levels.

4. The computer-implemented method of claim 1, wherein the mobile device comprises at least one of a smartphone, a tablet, a wearable device, or a virtual reality headset.

5. The computer-implemented method of claim 1, wherein the first preference score comprises an indication of a degree of customer service assistance to be offered to the user.

6. A system for providing a customized user experience, comprising:
a processor; and
a memory storing instructions, wherein the instructions cause the processor to:
detect, by at least one sensor at a predetermined location, a presence of a user;
based on the detected presence of the user, prompt the user to provide a preferred level of interaction, a preferred level of agent experience, and a preferred level of agent knowledge via a mobile device associated with the user;
receive, from the mobile device, a user input indicative of the preferred level of interaction, the preferred level of agent experience, and the preferred level of agent knowledge;
request a history of a plurality of transactions associated with the user from a database, the history comprising a degree of interaction with agents prior to completing the plurality of transactions and an amount of time spent interacting with the agents prior to completing the plurality of transactions;
determine an emotion of the user, wherein determining the emotion of the user comprises:
recording, by a sensor, a video of the user;
separating the video into a plurality of video frames; and
matching ones of the video frames to frames of facial expressions stored in the database using a trained machine learning algorithm;
assign a first preference metric based on the emotion;
record, by a microphone, a voice of the user;
assign a second preference metric based on the recorded voice;
aggregate the user input, the first preference metric, and the second preference metric to determine a first preference score representing a desired level of interaction of the user;
adjust the first preference score based on the degree of interaction and the amount of time to generate a second preference score, the second preference score being higher than the first preference score and indicative of a higher level of desired interaction of the user;
cause the second preference score to be displayed on an agent mobile device.

7. The system of claim 6, wherein the sensor is a Bluetooth low-energy beacon.

8. The system of claim 6, wherein the sensor is an RFID device.

9. The system of claim 6, wherein the sensor is a wireless sensor.

10. The system of claim 6, wherein recognizing the presence of the user further comprises receiving an electromagnetic signal from the mobile device.

11. The system of claim 6, wherein the machine-learning algorithm comprises a deep learning algorithm trained to match the video frames to a corresponding user emotion stored in the memory.

12. The system of claim 6, wherein generating the second preference score comprises generating a preference score comprising an indication of a degree of customer service assistance to be offered to the user.

13. A computer-implemented method of providing a customized user experience, the method comprising:
receiving information indicating a detected presence of a user;
based on the detected presence of the user, prompting the user to provide a preferred level of interaction, a preferred level of agent experience, and a preferred level of agent knowledge via a mobile device;

receiving, from a graphical user interface displayed on the mobile device, a user input indicative of the preferred level of interaction, the preferred level of agent experience, and the preferred level of agent knowledge;

requesting a history of a plurality of transactions associated with the user from a database, the history comprising a degree of interaction with agents prior to completing the plurality of transactions and an amount of time spent interacting with the agents prior to completing the plurality of transactions;

determining an emotion of the user, wherein determining the emotion of the user comprises:
    recording, by an image sensor, a video of the user;
    separating the video into a plurality of video frames; and
    processing ones of the video frames, by a machine-learning algorithm, to match the video frames to corresponding frames of facial expressions stored in the database using a trained machine learning algorithm;

assigning a first preference metric based on the emotion;

recording, by a microphone, a voice of the user;

assigning a second preference metric based on the recorded voice;

aggregating the user input, the first preference metric, and the second preference metric to determine a first preference score representing a desired level of interaction of the user;

adjusting the first preference score based on the degree of interaction and the amount of time to generate a second preference score, the second preference score being higher than the first preference score and indicative of a higher level of desired interaction of the user;

causing the second preference score to be displayed on an agent mobile device, wherein the preference score is used to modify a customer service experience.

\* \* \* \* \*